United States Patent [19]
Katsumata et al.

[11] Patent Number: 6,161,533
[45] Date of Patent: Dec. 19, 2000

[54] SLURRY MANAGING SYSTEM AND SLURRY MANAGING METHOD

[75] Inventors: Noboru Katsumata; Kensho Miyata, both of Yokosuka; Kazutomo Kinutani, Toyama-ken; Kensho Kuroda, Yokosuka; Toyotaka Wada, Yokosuka; Akihiro Nakayama, Yokosuka; Katsumasa Takahashi, Yokosuka; Takaharu Nishida, Osaka; Shouichi Uemura; Tetsuo Kodama, both of Ohtsu, all of Japan

[73] Assignees: Nippei Toyoma Corp.; Toyobo Co., Ltd., Japan

[21] Appl. No.: 09/257,748

[22] Filed: Feb. 25, 1999

Related U.S. Application Data

[63] Continuation-in-part of application No. 09/143,722, Aug. 31, 1998, Pat. No. 6,053,158, which is a continuation of application No. 08/724,657, Oct. 1, 1996, Pat. No. 5,799,643.

[30] Foreign Application Priority Data

Feb. 26, 1998 [JP] Japan ................................. 10-045841
Dec. 16, 1998 [JP] Japan ................................. 10-257543

[51] Int. Cl.[7] ......................................................... B24D 1/08
[52] U.S. Cl. ..................... 125/21; 125/16.01; 125/16.02; 451/36; 451/60; 451/5; 451/446
[58] Field of Search ............................... 451/36, 60, 446; 125/16.01, 16.02, 21

[56] References Cited

U.S. PATENT DOCUMENTS

| | | |
|---|---|---|
| 4,059,929 | 11/1977 | Bishop . |
| 4,762,422 | 8/1988 | Toncelli . |
| 4,872,975 | 10/1989 | Benson . |
| 5,080,807 | 1/1992 | Carr et al. . |
| 5,269,285 | 12/1993 | Toyama et al. .................. 125/16.01 |
| 5,285,903 | 2/1994 | Sorenson et al. . |
| 5,287,975 | 2/1994 | Chumley et al. . |
| 5,295,583 | 3/1994 | Bischofberger et al. . |
| 5,799,643 | 9/1998 | Miyata et al. . |
| 6,006,738 | 12/1999 | Itoh et al. ......................... 125/16.01 |

FOREIGN PATENT DOCUMENTS

| | | |
|---|---|---|
| 938494 | 4/1963 | Czechoslovakia . |
| 554097 | 6/1923 | France . |
| 59-232762 | 8/1984 | Japan . |
| 61-014862 | 5/1986 | Japan . |
| 1316170 | 12/1989 | Japan . |
| 3208555 | 9/1991 | Japan . |
| 639724 | 2/1994 | Japan . |
| 6114828 | 9/1994 | Japan . |
| 7251373 | 10/1995 | Japan . |
| 899261 | 1/1996 | Japan . |
| 678610 | 1/1991 | Switzerland . |

Primary Examiner—Derris H. Banks
Assistant Examiner—G. Nguyen
Attorney, Agent, or Firm—Stetina Brunda Garred & Brucker

[57] ABSTRACT

A managing system for managing slurry, which is supplied to a wire saw. Slurry is prepared in a preparing tank and sent to the wire saw and used to cut workpieces. After usage for cutting workpieces, the slurry is sent to a separating apparatus from the wire saw. The separating apparatus separates impurities from the used slurry to recover a mixture of recyclable dispersing liquid and abrasive grains from the used slurry. The recovered mixture is returned to the preparing tank. The recovered mixture is mixed with fresh abrasive grains and dispersing liquid in the preparing tank to prepare slurry. The property (specific gravity and viscosity) of the slurry in the preparing tank is detected. The amount of fresh abrasive grains and dispersing liquid supplied to the preparing tank is adjusted in accordance with the detection results. Accordingly, slurry having properties that are optimal for the cutting of workpieces is prepared.

35 Claims, 26 Drawing Sheets

SLURRY MANAGING SYSTEM AND SLURRY MANAGING METHOD

CROSS REFERENCE TO RELATED APPLICATION

This application is a continuation in part application of U.S. application Ser. No. 09/143,722 filed on Aug. 31, 1998, now U.S. Pat. No. 6,053,158, which is a continuation of U.S. application Ser. No. 08/724,657 filed on Oct. 1, 1996, now U.S. Pat. No. 5,799,643, both entitled SLURRY MANAGING SYSTEM AND SLURRY MANAGING METHOD FOR WIRE SAWS.

BACKGROUND OF THE INVENTION

The present invention relates to a system and method for managing slurry used to cut workpieces in cutting machines, such as wire saws or the like. More particularly, the present invention pertains to a slurry managing system and a slurry managing method that optimally control the properties of the slurry supplied to the cutting machines.

A wire saw is typically employed to cut workpieces, such as silicon ingots, or the like, into wafers. The wire saw includes a plurality of rollers and a single strand of wire, which is spirally wound about the rollers with a predetermined pitch between each winding. The wire is guided by the rotation of the rollers. During rotation of the rollers, slurry containing abrasive grains is fed to the wire. In this state, a workpiece is pressed against the wire to cut the workpiece into a plurality of wafers simultaneously.

The slurry is an aqueous or oleaginous liquid (dispersing liquid) in which abrasive grains are dispersed. The wire saw is provided with a managing system to prepare and manage the slurry. The managing system includes a preparing tank, in which abrasive grains and dispersion liquid are mixed to prepare the slurry. The slurry prepared in the preparing tank is fed to the wire saw.

It is preferred that the used slurry, which has been used by the wire saw to cut workpieces, be recycled to reduce the costs of cutting the workpieces. However, used slurry includes impurities, which are fine grain components that are smaller than the abrasive grains. More specifically, the used slurry includes impurities such as cutting chips of workpieces and fragmented abrasive grains. The impurities decrease the cutting capability of the wire saw.

The management system includes a separating apparatus that separates the impurities from the used slurry and recovers the recyclable abrasive grains and dispersing liquid. The recovered abrasive grains and dispersing liquid are returned to the preparing tank to be mixed with additionally supplied fresh abrasive grains and dispersing liquid to be prepared as slurry again. The slurry is then fed to the wire saw from the preparation tank and thus recycled.

The cutting performance of the wire saw depends greatly on the nature of the slurry fed to the wire, for example, the mixed weight ratio of the abrasive grains and the dispersing liquid. Thus, the properties of the slurry in the preparing tank must be maintained at optimal values to maximize the cutting performance of the wire saw. However, if the abrasive grains and dispersing liquid recovered by the separating apparatus are returned to the preparing tank, the properties of the slurry in the preparing tank fluctuates in accordance with the amount of the returned abrasive grains and dispersion liquid. This may hinder cutting.

Furthermore, fluctuations in the temperature of the used slurry or in the amount of impurities included in the used slurry change the properties (e.g., specific gravity or viscosity) of the used slurry. The changes in the properties of the used slurry alter the separating efficiency of the separating apparatus. This may hinder recovery of the abrasive grains and dispersing liquid from the used slurry or leave impurities in the recovered abrasive grains and dispersing liquid.

SUMMARY OF THE INVENTION

Accordingly, it is an objective of the present invention to provide a slurry managing system and a slurry managing method that is capable of preparing the slurry used for cutting to have properties optimum for the cutting of workpieces.

Another objective of the present invention is to provide a slurry managing system and a slurry managing method that guarantees the recovery of recyclable abrasive grains and dispersing liquid.

To achieve the above objectives, the present invention provides a managing system for managing slurry used to cut a workpiece. The slurry includes a dispersing liquid and abrasive grains. After the slurry has been used, the slurry further includes impurities that are finer than the abrasive grains. The managing system includes a preparing means for preparing the slurry prior to cutting, a first supplying means for supplying abrasive grains to the preparing means, a second supplying means for supplying dispersing liquid to the preparing means, a first adjusting means for adjusting the amount of the abrasive grains supplied to the preparing means from the first supplying means, and a second adjusting means for adjusting the amount of dispersing liquid supplied to the preparing means from the second supplying means. The managing system also includes a separating means for separating the impurities from the used slurry to recover a mixture of recyclable dispersing liquid and abrasive grains from the slurry, and a transferring means for transferring the recovered mixture to the preparing means. The preparing means mixes the recovered mixture with fresh abrasive grains and dispersing liquid to prepare slurry. The managing system further includes a detecting means for detecting a property of the slurry in the preparing means, and a control means for controlling the first adjusting means and the second adjusting means in accordance with the detection results of the detection means such that the property of the slurry becomes equal to a predetermined value.

The present invention further provides a managing method for managing slurry used to cut a workpiece. The slurry includes a dispersing liquid and abrasive grains. After the slurry has been used, the slurry further includes impurities that are finer than the abrasive grains. The managing method includes preparing the slurry prior to cutting with a preparing means, separating the impurities from the used slurry to recover a mixture of recyclable dispersing liquid and abrasive grains from the slurry, and transferring the recovered mixture to the preparing means. The preparing means mixes the recovered mixture with fresh abrasive grains and dispersing liquid to prepare slurry. The managing method further includes detecting a property of the slurry in the preparing means, and controlling the amount of the fresh abrasive grains and dispersing liquid supplied to the preparing means in accordance with the detected property of the slurry such that the property of the slurry becomes equal to a predetermined value.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

First Embodiment

A slurry managing system according to a first embodiment of the present invention will hereafter be described with reference to FIGS. 1 to 5.

Figure 1:
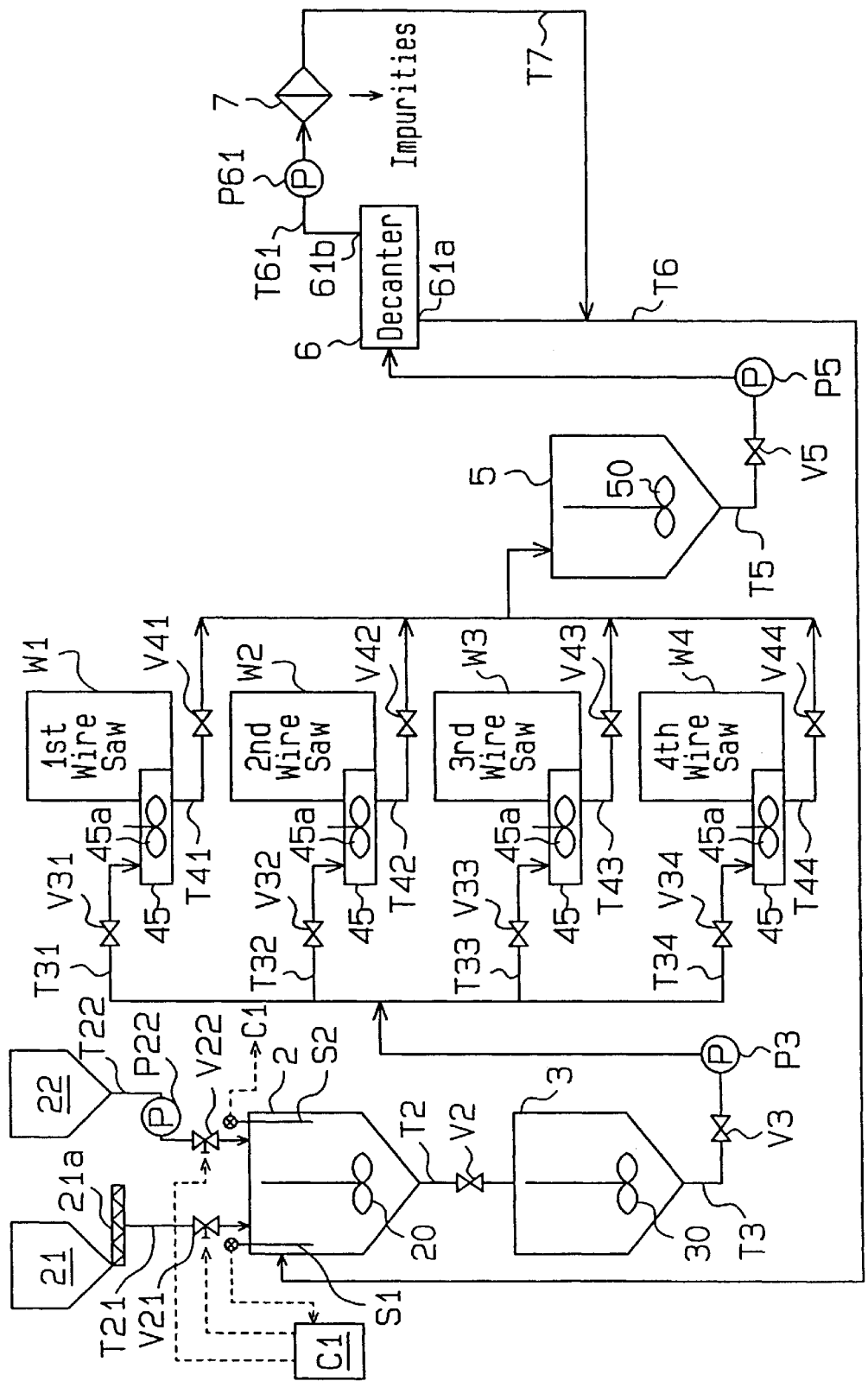
FIG. 1 is a schematic view showing the structure of a slurry managing system according to a first embodiment of the present invention.
Figure 2:
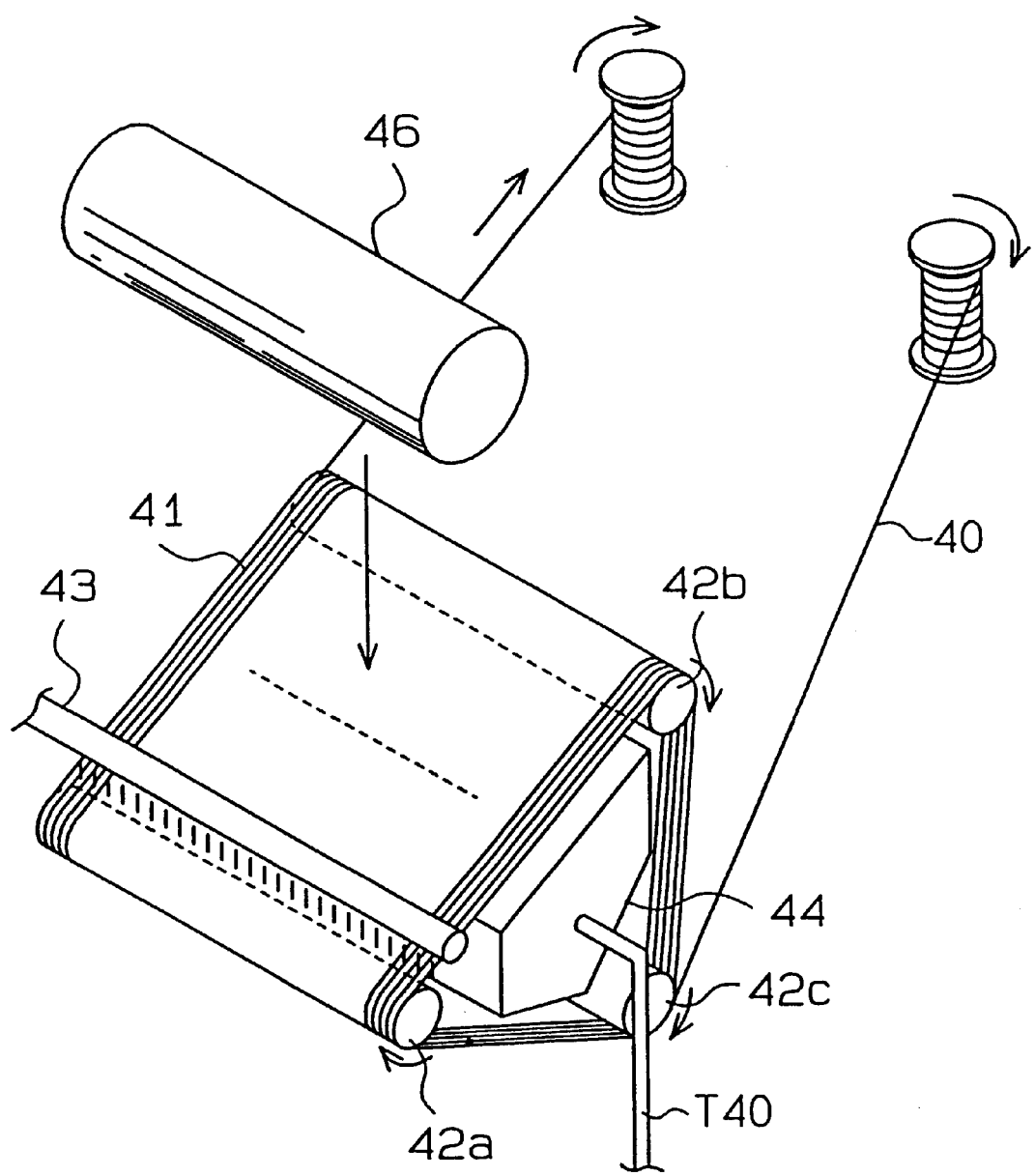
FIG. 2 is a perspective view showing the structure of the wire saw of FIG. 1.
Figure 3:
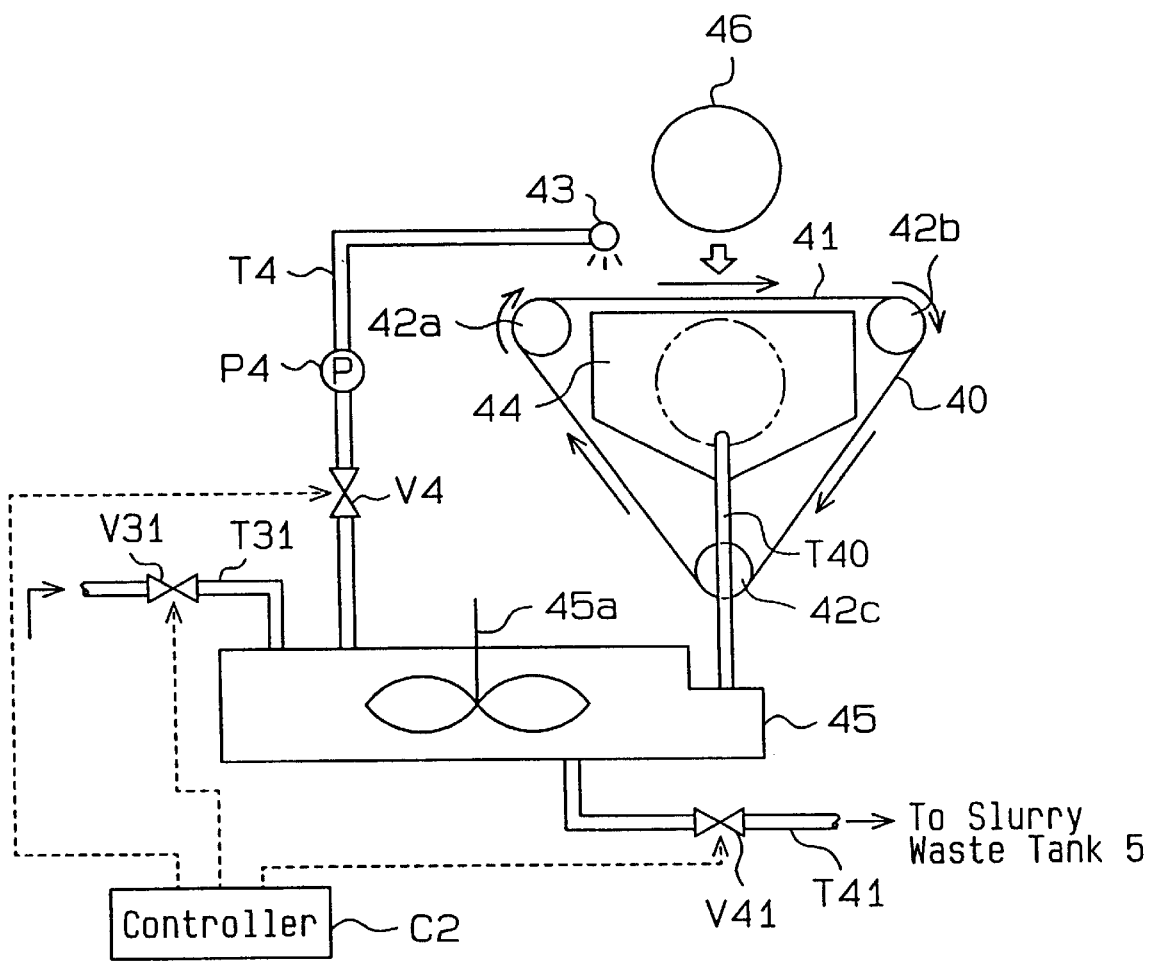
FIG. 3 is a diagrammatic view showing the wire saw of FIG. 1 and its peripheral structure.

As shown in FIG. 1, a preparing tank 2 serves as a preparing means for preparing slurry. An agitator 20 is arranged in the preparing tank 2. A hopper 21, which feeds abrasive grains to the preparing tank 2, is connected to the tank 2 by an oscillating feeder 21a and a pipe T21. A valve V21 is provided in the pipe T21 to adjust the amount of abrasive grains supplied to the preparing tank 2. A dispersing liquid tank 22, which supplies dispersing liquid (e.g., an oleaginous liquid, hereafter referred to as base oil) to the preparing tank 2, is connected to the tank 2 by a pipe T22. A valve V22 and a pump P22 are provided in the pipe T22.

A specific gravity gage S1 is arranged in the preparing tank 2 to meter the specific gravity of the slurry. A viscosity gage S2 is arranged in the preparing tank 2 to measure the viscosity of the slurry. The specific gravity gage S1 and the viscosity gage S2 serve as a detecting means that detects the percentage content of the abrasive grains in the slurry. A controller C1 transmits command signals to control the opening of the valves V21, V22 based on the values detected by the specific gravity gage S1 and the viscosity gage S2.

A reserve tank 3, which collects the mixed slurry, is connected to the preparing tank 2 by a pipe T2. The pipe T2 is provided with a valve V2. An agitator 30 is arranged in the reserve tank 3. A plurality of wire saws W1, W2, W3, W4 (four in this embodiment) are each provided with a slurry tank 45. Pipes T31, T32, T33, T34 extending respectively from the slurry tank 45 of each wire saw W1, W2, W3, W4 are each connected to the reserve tank 3 by a pipe T3. A valve V3 and a pump P3 are provided in the pipe T3. Supply valves V31, V32, V33, V34 are provided in the pipes T31, T32, T33, T34, respectively.

Each wire saw W1, W2, W3, W4 is connected to a slurry waste tank 5 by pipes T41, T42, T43, T44 extending respectively from the slurry tank 45 of each wire saw W1, W2, W3, W4. The slurry discharged from each slurry tank 45 is collected in the waste tank 5. An agitator 50 is provided in the waste tank 5. Discharge valves V41, V42, V43, V44 are provided in the pipes T41, T42, T43, T44, respectively.

The wire saws W1–W4 are identical to one another. Therefore, only the first wire saw W1 will be described below with reference to FIGS. 2 and 3. The wire saw W1 includes three rollers 42a, 42b, 42c that define a triangular zone. The wire saw W1 also includes a metal wire 40 that is spirally wound about the rollers 42a, 42b, 42c with a predetermined interval between each winding. The wire 40 that extends between the upper rollers 42a, 42b constitutes a wire group 41 in which each segment of the wire 40 is parallel to the adjacent segment. The rollers 42a, 42b, 42c are rotated in a clockwise direction, as viewed in FIG. 3, to feed the wire group 41 toward the right. A workpiece 46 is arranged above the wire group 41 so that it may be lowered to a position below the wire group 41.

Supply pipes 43 are arranged at an upstream side, with respect to the moving direction of the wire group 41, of an area through which the workpiece 46 moves. The supply pipes 43 extend perpendicularly to each segment of the wire 40 in the wire group 41. Slurry supply slits (not shown) are provided in the lower side of the supply pipes 43 and extend in the longitudinal direction of the pipes 43. A receiving tank 44 is arranged in the triangular zone defined by the rollers 42a to 42c. Slurry falls from between the segments of the wire 40 in the wire group 41 and is collected by the receiving tank 44. The receiving tank 44 is connected to the slurry tank 45 by a pipe T40. An agitator 45a is provided in the slurry tank 45.

The pipes T31, T41 and a supply pipe T4 are connected with the slurry tank 45. The slurry prepared in the preparing tank 2 is sent to the slurry tank 45 through the pipe T31. Slurry in the slurry tank 45 is discharged into the waste tank 5 through the pipe T41. Slurry in the slurry tank 45 is also sent to the supply pipes 43 through the supply pipe T4. A valve V4 and a pump P4 are provided in the supply pipe T4. A controller C2 selectively opens and closes the valves V31, V41, V4 of the pipes T31, T41, T4, respectively.

Figure 4:
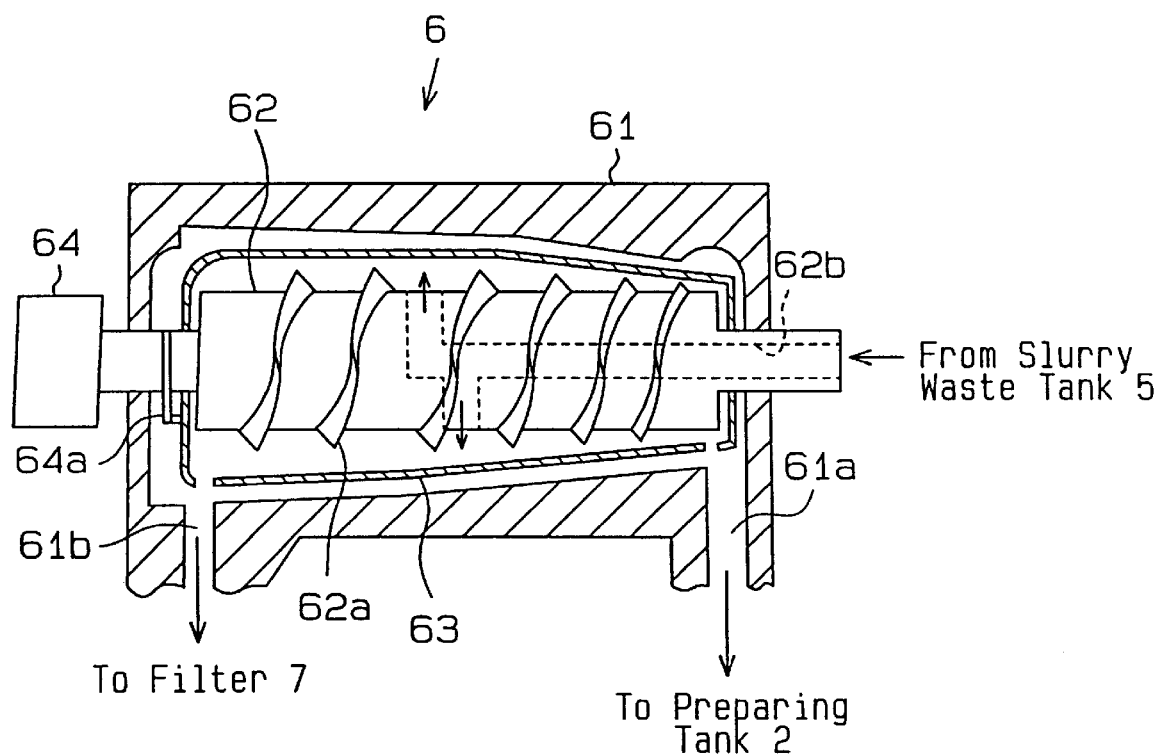
FIG. 4 is a cross-sectional view showing the structure of the decanter of FIG. 1.

As shown in FIG. 1, a decanter 6 is connected to the waste tank 5 by a pipe T5. In this embodiment, the decanter 6 serves as a first separating/recovering means. More specifically, the decanter 6 centrifuges the waste slurry discharged from the wire saws W1–W4 and separates the base oil and impurities, which are smaller than the abrasive grains, from the abrasive grains to recover recyclable abrasive grains. The decanter 6 may have a structure as shown in FIG. 4. As shown in FIG. 4, a screw conveyor 62 is provided in a main body 61 of the decanter 6 so that its axis extends longitudinally in the decanter body 61. A spiral screw 62a is defined on the peripheral surface of the conveyor 62. An inner tube 63 is provided in the body 61 to encompass the conveyor 62. The conveyor 62 is rotated directly by a motor 64. The inner tube 63 is rotated indirectly by the motor 64 through a belt 64a. This enables the inner tube 63 to rotate at a speed that differs from that of the conveyor 62.

The decanter body 61 includes an outlet 61a for the abrasive grains and an outlet 61b for the oil. The centrifugally separated solid abrasive grains are discharged from the body 61 through the grain outlet 61a. The base oil and the impurities, which are smaller than the abrasive grains, are discharged from the decanter body 61 through the outlet 61b. A slurry supply passage 62b is defined in the conveyor 62. The supply passage includes an inlet connected with the pipe T5 and an outlet connected with the interior of the inner tube 63. As shown in FIG. 1, the grain outlet 61a is connected to the preparing tank 2 by a first pipe T6. The first pipe T6 serves as a conveyor through which the recovered abrasive grains are conveyed. The outlet 61b is connected to a filter 7 by a pipe T61, which is provided with a pump P61. In this embodiment, the filter 7 serves as a second separating/recovering means.

The filter 7 is, for example, made of a nonwoven fabric. The filter 7 removes impurities from the base oil, which includes impurities that are smaller than the abrasive grains and are discharged from the decanter 6 through the outlet 61b from the base oil, and recovers the strained base oil. The filter 7 is connected to the first pipe T6 by way of a second pipe T7. The second pipe T7 serves as a transferring means through which the base oil recovered by the filter 7 is transferred to the preparing tank 2.

The operation of the slurry managing system having the above structure will now be described.

The valve V21 is first opened to supply a predetermined amount of abrasive grains into the preparing tank 2 from the hopper 21 and the screw feeder 21a. The valve V22 is simultaneously opened to supply a predetermined amount of base oil into the preparing tank 2 from the liquid tank 22. The agitator 20 mixes the abrasive grains and the base oil to prepare slurry in the preparing tank 2. The prepared slurry is temporarily stored in the reserve tank 3. The slurry in the reserve tank 3 is then supplied into the slurry tank 45 of each wire saw W1–W4 by opening the valve V3 and the associated supply valves V31–V34.

The fresh abrasive grains supplied from the hopper 21 consist of grains that are made of materials such as silicon carbide, boron carbide, diamond, and boron nitride. The average grain diameter of the abrasive grains is in the range of 5 to 30 micrometers. Abrasive grains within this diameter range are optimum for slicing the wafers. The mixed weight ratio of the abrasive grains and the base oil mixed in the preparing tank 2 is in the range of 1:0.91 to 1:0.6. For example, if 100 kilograms of abrasive grains are fed from the hopper 21, the liquid tank 22 provides 89 kilograms of base oil. Thus, the abrasive grains and the base oil are mixed into slurry having a mixed weight ratio of 1:0.89. Furthermore, if the base oil is of a type having high viscosity, the viscosity of the slurry is set in the range of 150 to 220 centipoise (cp). If the base oil is of a type having low viscosity, the viscosity of the slurry is set in the range of 40 to 60 cp.

The workpieces 46 are cut into wafers by each of the wire saws W1 to W4. The slicing of the workpieces 46 will be described with reference to FIG. 3 using the first wire saw W1 as a representative example. The controller C2 first opens the valve V4 while closing the supply valve V31 and the discharge valve V41. The slurry in the slurry tank 45 is supplied to the wire group 41 through the supply pipes 43 by the pump P4. In this state, each workpiece 46 is lowered from a position above the wire group 41 to a position below the wire group 41. The workpiece 46 is sliced into a plurality of wafers through the traveling wire group 41, to which abrasive grains are adhered.

During the cutting, the slurry supplied to the wire group 41 from the supply pipes 43 falls into the receiving tank 44. The slurry is then collected in the slurry tank 45 and sent back to the supply pipes 43 through the pipe T4. The used slurry includes, for example, abrasive grains having an average grain diameter of 10 to 30 micrometers, fragmented abrasive grains having an average grain diameter of 5 to 15 micrometers, cutting chips removed from the workpiece 46 having a grain diameter within the range of a submicron value to a few micrometers, and metal particles removed from the wire 40.

Further cutting of workpieces 46 gradually increases the amount of cutting chips and metal particles in the slurry. This degrades the cutting capability of the slurry. Therefore, during a predetermined cycle of the cutting process (e.g., the second cycle), the controller C2 opens the discharge valve V41 for a predetermined time period and discharges a portion of the used slurry in the slurry tank 45 through the pipe T41. Simultaneously, the controller C2 opens the supply valve V31 for a predetermined time period to provide a predetermined amount of fresh slurry, which has been mixed in the preparing tank 2 (FIG. 1), through the reserve tank 3 and the pipe T31. This replaces some of the slurry in the slurry tank 45 with fresh slurry, which regenerates the slurry in the tank 45 while cutting is carried out. The controller C2 closes the valves V31, V41 before the cutting cycle of the subsequent workpiece 46 is commenced.

The slurry waste discharged from the slurry tank 45 of each of the wire saws W1–W4 is first collected in the waste tank 5, shown in FIG. 1, and is then sent to the decanter 6 when the valve V5 is opened. As shown in FIG. 4, the slurry waste is conveyed into the decanter body 61 through the supply passage 62b. The motor rotates the screw conveyor 62 and the inner tube 63 at different rotating speeds and applies a centrifugal force to the slurry. This moves the abrasive grains in the slurry outward toward the inner walls of the body 61 and forms a layer of base oil, which includes impurities that are smaller than the abrasive grains, such as cutting chips, fragmented abrasive grains, and metal particles. In this manner, the abrasive grains in the slurry are separated from the base oil that includes impurities.

As shown in FIG. 1, the abrasive grains separated from the slurry in the decanter 6 are sent to the first pipe T6. The pump P61 sends the base oil that includes the impurities to the filter 7 through the pipe T61. The filter 7 separates and removes the impurities such as cutting chips, fragmented abrasive grains, and metal particles from the base oil and thus recovers the oil. The base oil recovered by the filter 7 is conveyed to the first pipe T6 through the second pipe T7 and merged with the abrasive grains. The abrasive grains and the base oil are conveyed to the preparing tank 2 through the first pipe T6.

A centrifugal acceleration of 150 to 500 G (preferably 300 G) is applied for approximately 80 seconds in the decanter 6 to separate the abrasive grains. The centrifugal acceleration range of 150 to 500 G is optimum for separating abrasive grains having a grain diameter of 5 to 30 micrometers. The recovery rate of abrasive grains recovered by the decanter 6 from the slurry waste is set in the range of 85 to 95 percent by weight. The recovery rate of the impurities, such as cutting chips, separated by the filter 7 is set in the range of 30 to 50 percent by weight. The recovery rate of the base oil is set at approximately 90 percent by weight.

The specific gravity and the viscosity of the slurry are detected by the specific gravity gage S1 and the viscosity gage S2, respectively. The detected values are sent to the controller C1. A target value for the specific gravity and the viscosity is prestored in the controller C1. Accordingly, the target values are compared with the detected values. This enables the controller C1 to control the opening of the valves V21, V22 based on the difference between the two values and adjust the amount of abrasive grains from the hopper 21 and the amount of base oil from the dispersing liquid tank 22.

Data is stored in the controller C1 to acknowledge the relationship between the values detected by the specific gravity gage S1 and the viscosity gage S2 (i.e., the specific gravity and viscosity of the slurry) and the percentage content of the abrasive grains included in the slurry. It is characteristic of the slurry that the specific gravity and viscosity become higher as the percentage content of the abrasive grains in the slurry becomes higher. The specific gravity and viscosity become lower as the percentage content of the abrasive grains in the slurry becomes lower. Repetition of the cutting of the workpieces 46 gradually increases the amount of fragmented abrasive grains and decreases the amount of normal abrasive grains sent to the preparing tank 2 from the decanter 6. This reduction lowers the specific gravity and the viscosity of the slurry in the preparing tank 2. Accordingly, the opening of the valve V21 is enlarged to increase the amount of abrasive grains fed from the hopper 21.

The impurities, such as the cutting chips, fragmented abrasive grains, metal particles, separated by the filter 7 are removed from the filter 7 and disposed externally. Since the base oil adheres to the impurities, the amount of oil sent to the preparing tank decreases gradually. This reduction increases the specific gravity and the viscosity of the slurry in the preparing tank 2. Accordingly, the opening of the valve V22 is enlarged to increase the amount of base oil supplied from the liquid tank 22.

The mixed weight ratio of the abrasive grains and the base oil of the slurry mixed in the preparing tank 2 is adjusted in the above manner so that it is maintained within the range of 1:0.91 to 1:0.6.

The advantages of this embodiment will now be described.

Abrasive grains and base oil are separated from the slurry waste discharged from the wire saws W1–W4 and recovered so that it may be recycled. This greatly reduces the amount of the newly added abrasive grains and base oil used to cut the workpieces 46 and decreases the cost of the cutting process.

Slurry can be continuously supplied to the wire saws W1–W4. Thus, the wire saws can perform cutting successively without any interruptions. This increases productivity. Therefore, the uninterrupted cutting saves further costs in addition to the costs saved by the recycling of the abrasive grains and the base oil.

The percentage content of the abrasive grains in the slurry is determined based on the detected specific gravity or viscosity of the slurry. The amount of abrasive grains and base oil is then adjusted so that the percentage content is maintained at a predetermined value. This results in continuous, stable cutting conditions.

Recycling of the base oil reduces the amount of industrial waste. This dramatically reduces the cost required to process the industrial waste.

The mixed weight ratio of the abrasive grains and the base oil mixed to obtain the slurry is adjusted so that it is maintained within the range of 1:0.91 to 1:0.6. The workpieces 46 are cut most easily when the mixed weight ratio of the slurry is set within this range.

Figure 5:
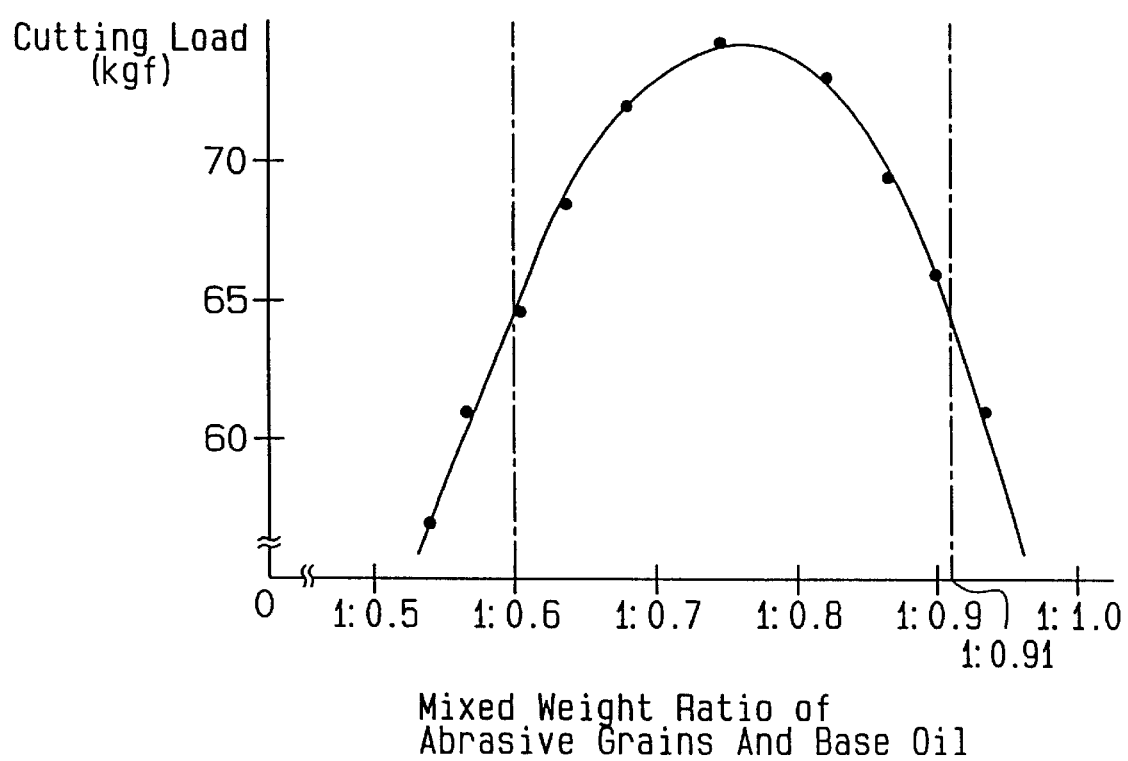
FIG. 5 is a graph showing the relationship between the mixed weight ratio of abrasive grains and base oil in the slurry and the cutting load.

FIG. 5 is a graph showing the relationship between the mixed weight ratio of the abrasive grains and base oil in the slurry and the cutting load. The data for this graph was obtained under the following cutting conditions. A is square pillar-like workpiece having a cross-section of 100 square millimeters and made of a polycrystalline silicon was used. The workpiece was cut by a wire having a diameter of 0.18 millimeters and traveling at a velocity of 500 m/min. The workpiece is cut more efficiently as the cutting load is increased. Accordingly, based on the graph of FIG. 5, the mixed weight ratio of the abrasive grains and the base oil in the slurry is set between 1:0.91 to 1:0.6, which is the range in which the cutting load increases.

In the above embodiment, the filter 7 may be employed as the first separating/recovering means and the decanter 6 may be employed as the second separating/recovering means. As another option, a filter 7 may be employed for both the first and the second separating/recovering means.

Second Embodiment

A second embodiment according to the present invention will hereafter be described with reference to FIG. 6. Parts identical to those used in the first embodiment will be denoted with the same numerals and will not be described.

Figure 6:
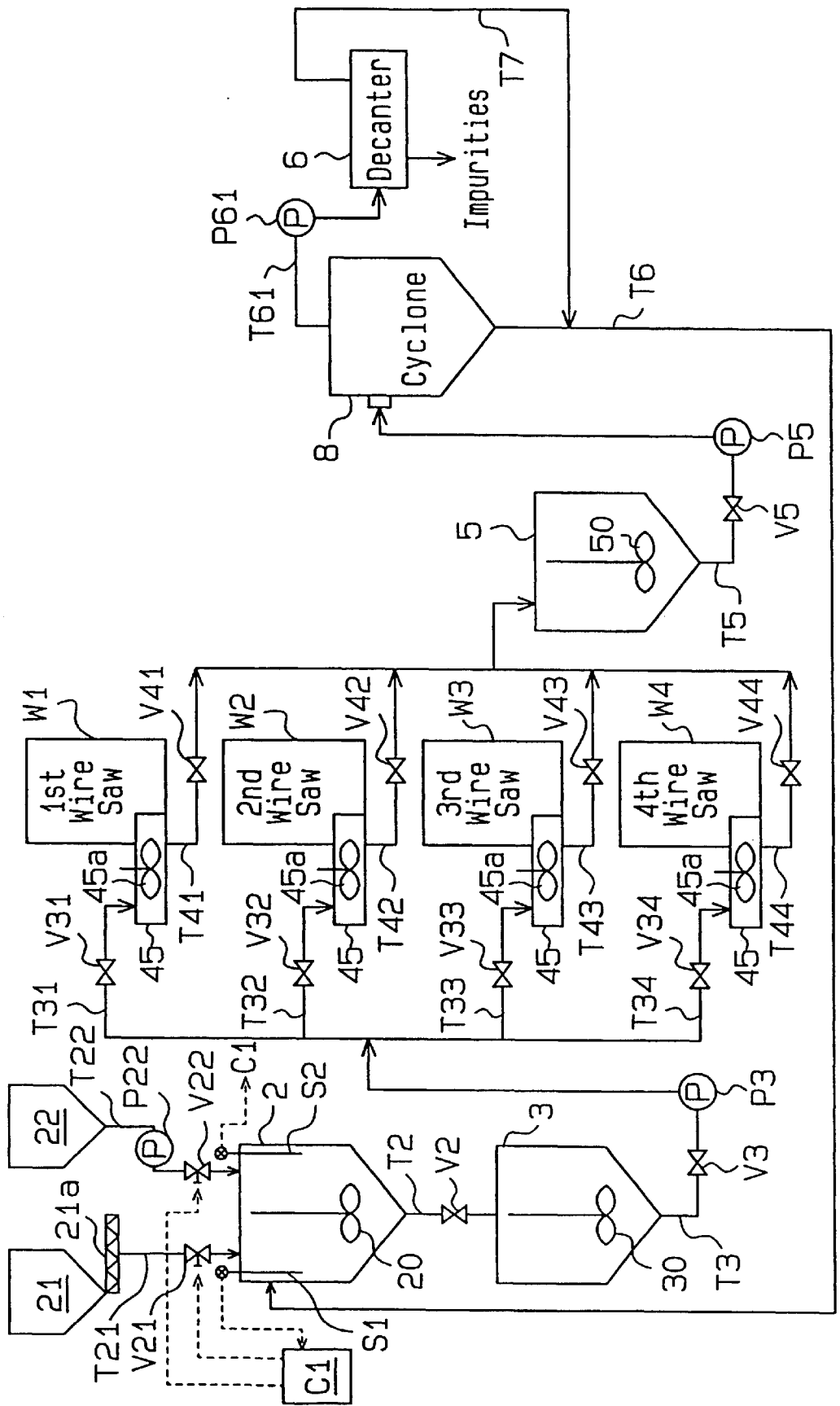
FIG. 6 is a schematic view showing the structure of a slurry managing system according to a second embodiment of the present invention.

As shown in FIG. 6, the slurry managing system of the second embodiment employs a cyclone 8 as the first separating/recovering means and the decanter 6 as the second separating/recovering means. The cyclone 8 separates the impurities, which are smaller than the abrasive grains, and the base oil from the slurry waste and recovers the recyclable abrasive grains. The decanter 6 separates the impurities from the base oil and recovers the recyclable base oil.

More specifically, centrifugal force, which is produced by a swirling descending current, acts on the abrasive grains in the slurry waste. This causes the abrasive grains to collide against the inner walls of the cyclone 8. These abrasive grains are collected as they fall down in the cyclone 8 and are discharged from the bottom section of the cyclone 8 through the first pipe T6. The base oil and impurities such as cutting chips, fragmented abrasive grains, and metal particles are carried along a cyclonic ascending swirling current and discharged from the top section of the cyclone 8 through the pipe T61. The abrasive grains from the slurry waste are recovered in this manner. The base oil and impurities are sent to the decanter 6 through the pipe T61 by the pump P61. The decanter 6 separates the base oil from the impurities.

The abrasive grains separated and recovered by the cyclone 8 are sent to the preparing tank 2 through the pipe T6. The base oil separated and recovered by the decanter 6 is sent to the first pipe T6 through the second pipe T7 and then conveyed toward the preparing tank 2 together with the abrasive grains. The remaining structure and operation of this slurry managing system is the same as the first embodiment illustrated in FIG. 1.

During the primary separation executed by the cyclone 8, the abrasive grains are separated by applying, for example, centrifugal acceleration of 300 G for 80 seconds. During the secondary separation executed by the decanter 6, the impurities are separated from the base oil by applying, for example, centrifugal acceleration of 2,000 to 3,000 G for 50 seconds.

In this embodiment, the decanter 6 may be employed as the first separating/recovering means and the cyclone 8 may be employed as the second separating/recovering means. As another option, the cyclone 8 may be employed as the first separating/recovering means while the filter 7 of the first embodiment is employed as the second separating/recovering means. The cyclone 8 may be employed as the first separating/recovering means while the filter 7 of the first embodiment is employed as the second separating/recovering means. The filter 7 of the first embodiment may be employed as the first separating/recovering means while the cyclone 8 is employed as the second separating/recovering means. Further, a cyclone 8 may be employed as both the first and the second separating/recovering means.

Third Embodiment

A third embodiment according to the present invention will hereafter be described with reference to FIG. 7. Parts identical to those used in the first embodiment will be denoted with the same numerals and will not be described.

Figure 7:
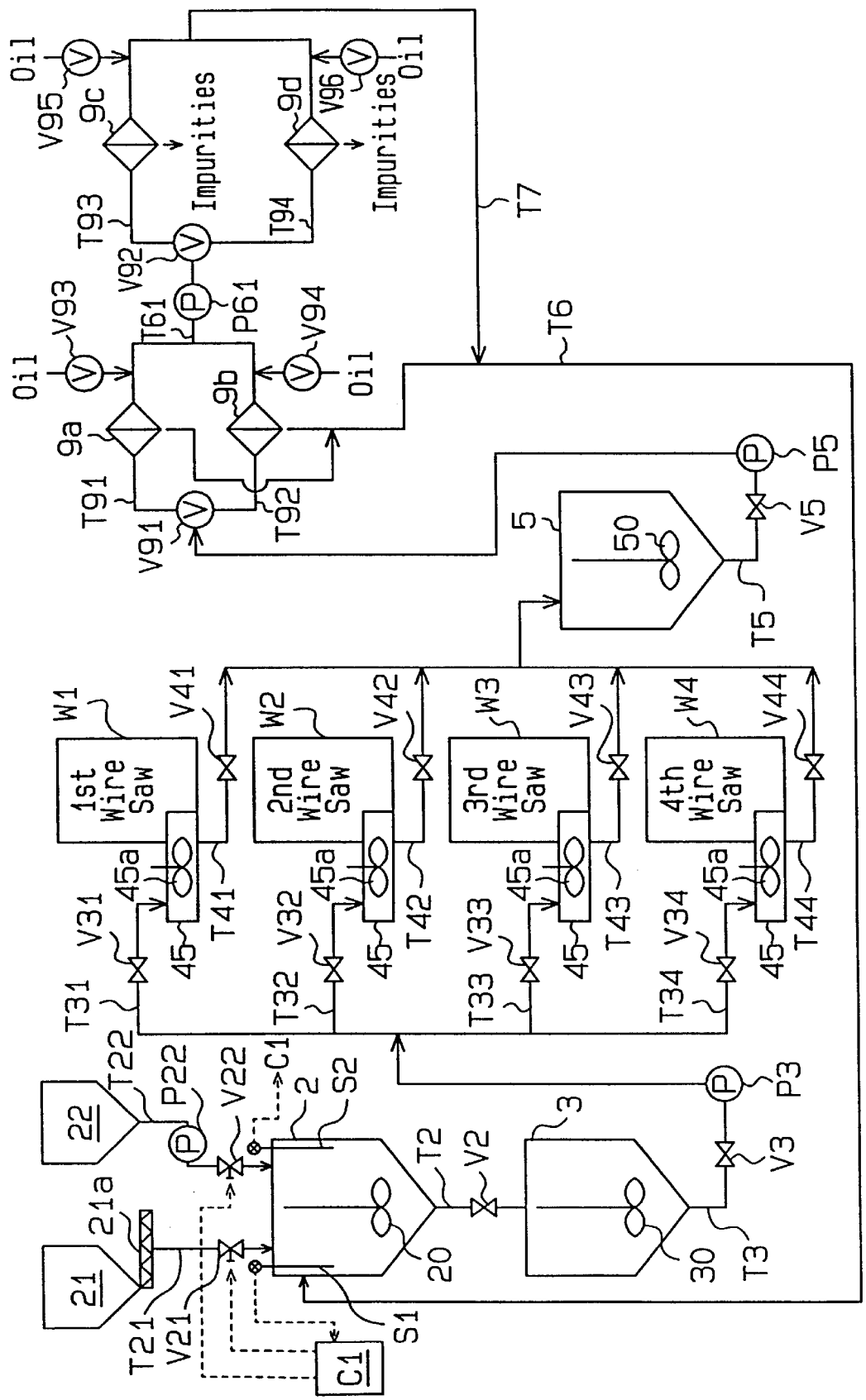
FIG. 7 is a schematic view showing the structure of a slurry managing system according to a third embodiment of the present invention.

As shown in FIG. 7, the slurry managing system of the third embodiment employs a pair of first filters 9a, 9b as the first separating/recovering means and a pair of second filters 9c, 9d as the second separating/recovering means. The first filters 9a, 9b separate the impurities, which are smaller than the abrasive grains, and the base oil from the slurry waste and recover the recyclable abrasive grains. The second filters 9c, 9d separate the impurities from the base oil and recover the base oil.

More specifically, a three-way switching valve V91 can switch the flow of slurry waste from the slurry waste tank 5 from one of the first filters 9a, 9b to the other through pipes T91, T92 after every predetermined time period. This separates the impurities and the base oil from the slurry waste and recovers the abrasive grains. The base oil that includes the impurities is sent toward a three-way switching valve V92 through the pipe T61 by the pump P61. The switching valve V92 switches the flow of the base oil, which includes the impurities, in the pipe T61 from one of the second filters 9c, 9d, to the other after every predetermined time period. This separates the impurities from the base oil.

When the switching valve V91 stops the flow of slurry waste, the valve V93 or V94 is opened so that washing oil flows from the downstream side of the pipes T91, T92 to wash the filtering surfaces of the first filters 9a, 9b. In the same manner, when the switching valve V92 stops the flow of base oil and impurities, the valve V95 or V96 is opened so that washing oil flows from the downstream side of the pipes T93, T94 to wash the filtering surfaces of the second filters 9c, 9d.

The abrasive grains recovered by the first filters 9a, 9b are sent to the preparing tank 2 through the first pipe T6. The base oil recovered by the second filters 9c, 9d is sent to the first pipe T6 through the second pipe T7 and then conveyed toward the preparing tank 2 together with the abrasive grains. The remaining structure and operation of this slurry managing system is the same as the first and second embodiments.

In this embodiment, the first filters 9a, 9b may be employed as the first separating/recovering means and the cyclone 8 or the decanter 6 of the second embodiment may be employed as the second separating/recovering means. As another option, the cyclone 8 employed in the sixth embodiment or the decanter 6 may be employed as the first separating/recovering means while the second filters 9c, 9d are employed as the second separating/recovering means.

The first, second, and third embodiments may be modified as described below.

The specific gravity gage S1 and the viscosity gage S2 may be arranged in the reserve tank 3 to detect the percentage content of the abrasive grains in the slurry. In this case, the abrasive grains and base oil recovered from the slurry waste may be conveyed to the reserve tank 3.

The specific gravity gage S1 and the viscosity gage S2 may be arranged in the pipe T6 at a location downstream of the intersection with the second pipe T7 to detect the percentage content of the abrasive grains in the slurry within the pipe T6.

The specific gravity gage S1 and the viscosity gage S2 may be arranged in the pipe T2 between the preparing tank 2 and the reserve tank 3. Alternatively, the specific gravity gage S1 and the viscosity gage S2 may be arranged in a pipe parallel to the pipes T2, T3.

The single-purpose reserve tank 3 may be eliminated.

The percentage content of the abrasive grains in the slurry may be detected by only the specific gravity gage S1 or only the viscosity gage S2.

The percentage content of the abrasive grains in the slurry may be detected by a detecting means that differs from the specific gravity gage S1 and the viscosity gage S2. For example, the detecting means may be an optical device such as a turbidimeter.

The amount of the base oil left adhered to impurities and the fragmented abrasive grains separated by the second separating/recovering means is affected by the separating/recovering capability of the first and second separating/recovering means. Therefore, the separating/recovering capability may be referred to when determining the content of the abrasive grains and base oil recovered from the slurry waste.

The dispersing liquid of the slurry may be aqueous instead of being oleaginous. When using an aqueous dispersing liquid, it is preferable that the mixed weight ratio of the abrasive grains and the dispersing liquid be maintained within the range of 1:0.76 to 1:0.5. In comparison with the oleaginous slurry of the first, second, and third embodiments, the percentage content of the abrasive grains of the aqueous slurry is about 20 percent higher. In other words, in comparison with oleaginous slurry, it is difficult for the abrasive grains to be dispersed in a uniform manner in the preparing tank 2 when using an aqueous slurry. Therefore, to consistently provide abrasive grains to the wire saws, it is required that the percentage content of the abrasive grains be high when using aqueous slurry. The workpieces 46 are cut under the optimum cutting conditions when the mixed weight ratio of the aqueous slurry is set within the above range. The viscosity of the aqueous slurry is to be maintained within the range of 40 to 50 cp.

Fourth Embodiment

A fourth embodiment according to the present invention will hereafter be described with reference to FIGS. 8 to 11. Parts identical to those used in the first embodiment will be denoted with the same numerals and will not be described.

Figure 8:
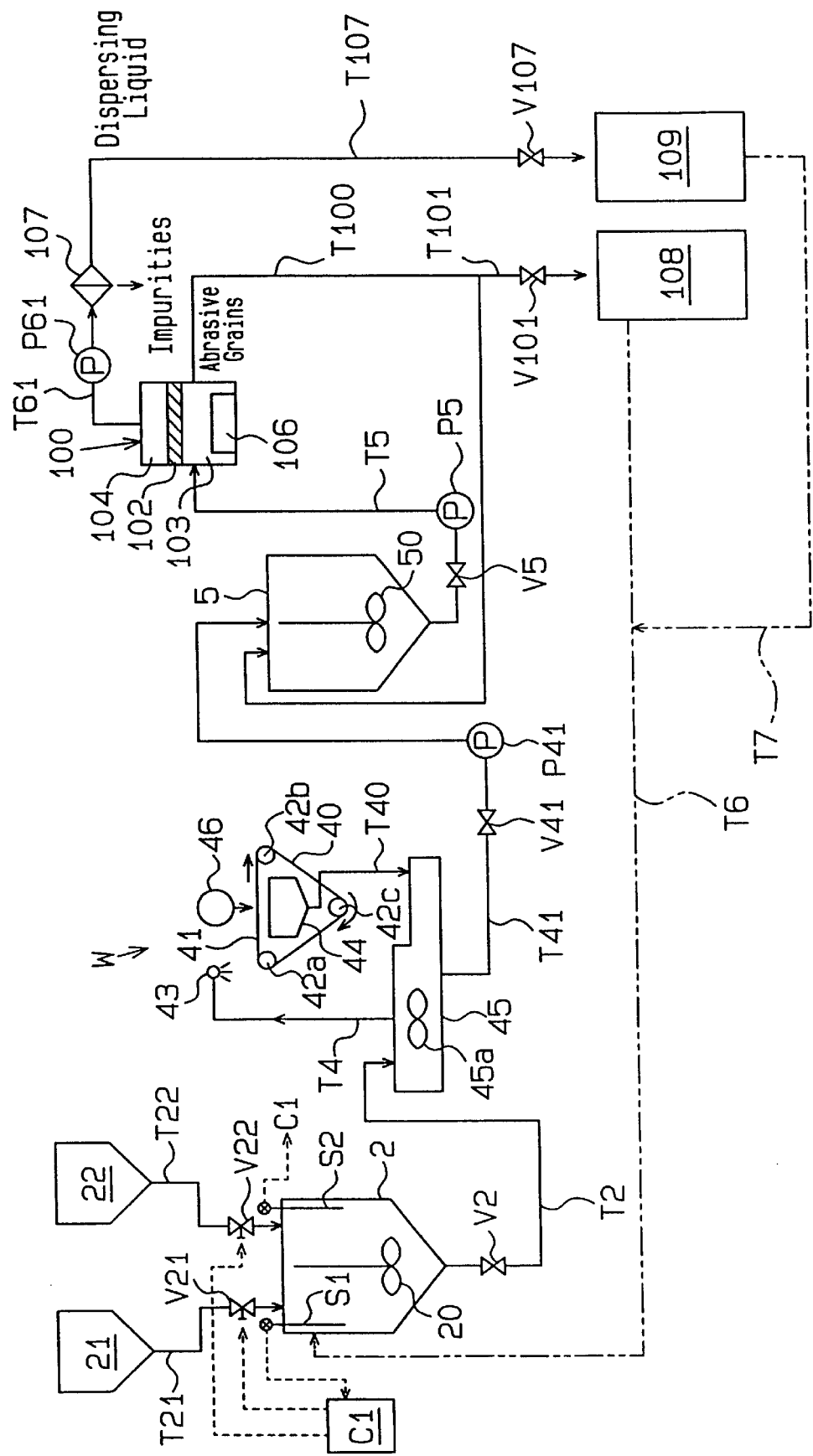
FIG. 8 is a schematic view showing the structure of a slurry managing system according to a fourth embodiment of the present invention.

As shown in FIG. 8, the hopper 21 that feeds abrasive grains into the preparing tank 2 is connected to the preparing tank 2 by the pipe T21, which is provided with the valve V21. The liquid dispersing tank 22, which provides the preparing tank 2 with dispersing liquid, is connected to the preparing tank 2 by the pipe T22, which is provided with the valve V22. The dispersing liquid is either aqueous or oleaginous. The specific gravity gage S1 and the viscosity gage S2 are arranged in the preparing tank 2. The controller C1 transmits a command signal to control the opening of the valves V21, V22 based on the values detected by the gages S1, S2.

The preparing tank 2 is connected to the slurry tank 45 of a wire saw W by the pipe T2, which is provided with the valve V2. The wire saw W has a structure which is identical to the structure of the wire saws W1–W4 employed in the first embodiment and therefore will not be described. The number of wire saws is not restricted and is arbitrary. The slurry tank 45 of the wire saw W is connected to the slurry waste tank 5 by the pipe T41, which includes the discharge valve V41 and the pump P41.

The waste tank 5 is connected to a separating apparatus 100, which constitutes a first separating/recovering means, by the pipe T5, which is provided with a valve V5 and a pump P5. The separating apparatus 100 has a structure such as that shown in FIG. 9. The apparatus 100 includes a cylindrical container 101 which constitutes the apparatus body. A filter 102 is arranged in the container 101 and defines an upstream first chamber 103 and a downstream second chamber 104 at the lower and upper sides in the container 101. The filter 102 is constituted by, for example, a plurality of superimposed round metal screens. A support frame 105 secures the outer rim of the filter 102 to the inner wall of the container 101.

An ultrasonic oscillator 106 is arranged in the first chamber 103 to face the filter 102. The area of the upper surface of the ultrasonic oscillator 106 is, for example, about the same as the surface area of the filter 102. The space between the upper surface of the ultrasonic oscillator 106 and the filter 102 is set at, for example, five millimeters. The controller C1 controls the activation and de-activation of the ultrasonic oscillator 106. The controller C1 also controls the opening and closing of the valves and the activation and de-activation of the pumps.

The filter 102 has a plurality of pores that prevent the passage of the abrasive grains and allow the passage of impurities, which are fine granular components (more specifically, cutting chips, fragmented abrasive grains, metal particles, etc.) that are smaller than the abrasive grains, and the dispersing liquid. The diameter of the pores is determined in accordance with the size of the grains that are to pass through the filter 102. Thus, the size of the pores is set at, for example, 5 to 20 micrometers. That is, if it is assumed that the pores allow passage of grains having a grain diameter of about 6 to 7 micrometers, the diameter of the pores in the filter 102 is set at about 10 micrometers, which is about 1.4 to 1.7 times the size of the grains that are to pass through the pores.

Figure 9:
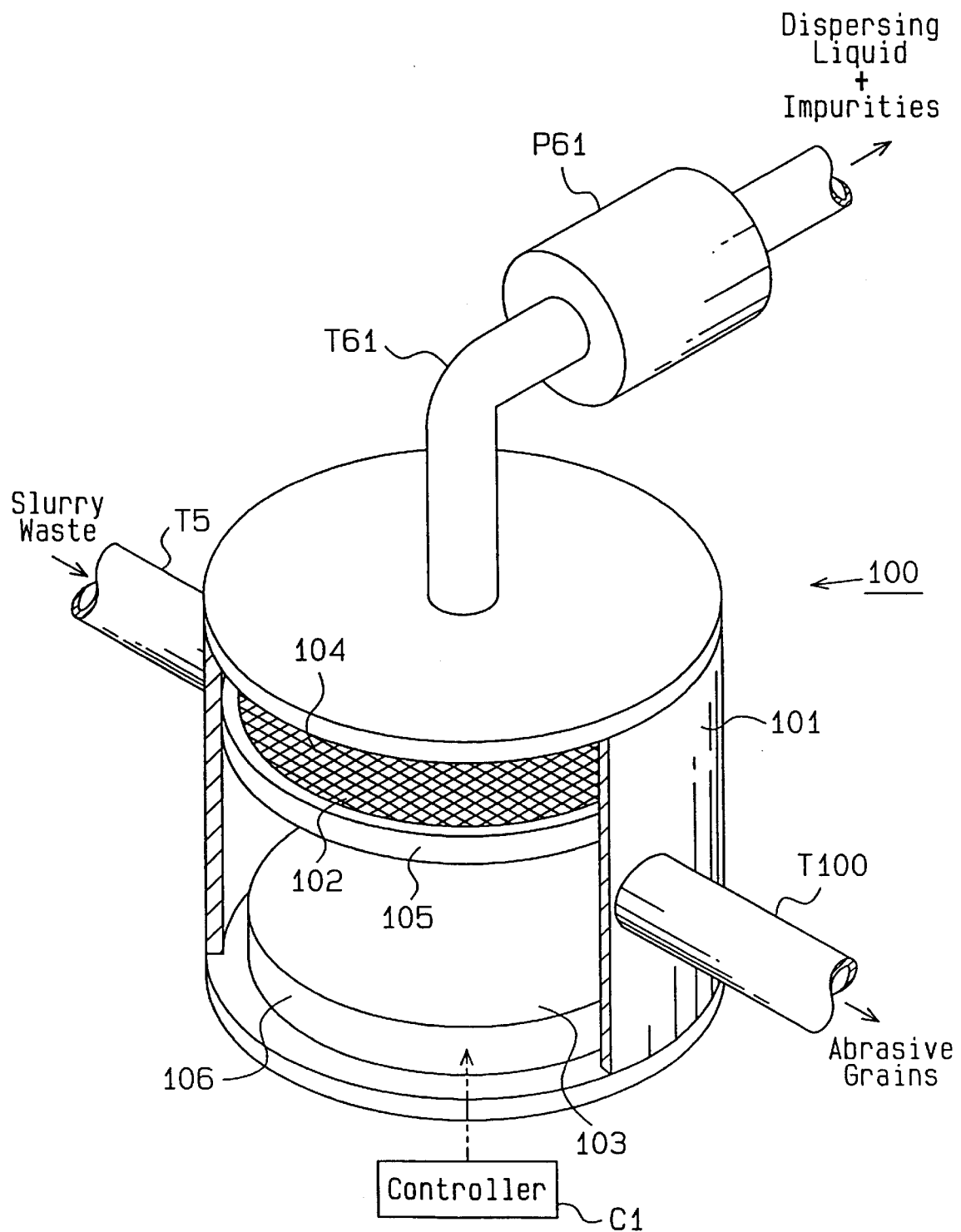
FIG. 9 is a partially cutaway perspective view showing the structure of the separating apparatus of FIG. 8.

As shown in FIGS. 8 and 9, the pipe T5, through which slurry waste is conveyed from the waste tank 5 to the first chamber 103, has an outlet connected with the container 101. A pipe T100, through which slurry waste including the abrasive grains is conveyed from the first chamber 103, has an inlet connected with the container 101 and an outlet connected with the waste tank 5. A pipe T101 has an inlet connected with a mid-section of the pipe T100 and an outlet connected with an abrasive grain tank 108. A valve V101 is provided in the pipe T101.

The pipe T61, through which dispersing liquid including the impurities is discharged from the second chamber 104, has an inlet connected with the container 101 and an outlet connected with a filter 107, which serves as a second separating/recovering means. The pipe T61 is provided with the pump P61. The filter 107 is similar to the filter 7 employed in the first embodiment and separates impurities from the dispersing liquid to recover the dispersing liquid. A pipe T107, which is provided with a valve V107, connects the filter 107 to a dispersing liquid tank 109, which collects the dispersing liquid.

The operation of the fourth embodiment, which has the above structure, will now be described.

The valve V21 is first opened to deliver a predetermined amount of abrasive grains to the preparing tank 2 from the hopper 21. The agitator 20 mixes the abrasive grains and the dispersing liquid to prepare slurry in the preparing tank 2. The mixed weight ratio of the abrasive grains and the dispersing liquid of the slurry prepared in the preparing tank 2 is set within the same range specified for the first embodiment. The mixed slurry is then supplied into the slurry tank 45 of the wire saw W as the valve V2 is opened.

The wire saw W cuts the workpieces 46 in the same manner described with respect to the first embodiment. More specifically, after the valves V2 and V41 are closed, the slurry in the slurry tank 45 is supplied to the wire group 41 through the supply pipes 43. In this state, each workpiece 46 is lowered from a position above the wire group 41 to a position below the wire group 41. The workpiece 46 is sliced into a plurality of wafers as it passes through the traveling wire group 11, to which abrasive grains are adhered.

During the cutting, the slurry supplied to the wire group 41 from the supply pipes 43 falls therefrom into the receiving tank 44. The slurry is then collected in the slurry tank 45 and sent back to the supply pipes 43 through the pipe T4. The slurry used to cut the workpiece 46 includes, for example, dispersing liquid having a viscosity of about 180 cp, abrasive grains having an average grain diameter of 10 to 30 micrometers, fragmented abrasive grains having an average grain diameter of 5 to 15 micrometers, cutting chips removed from the workpiece 46 having a grain diameter within the range of a submicron value to a few micrometers, and metal particles removed from the wire 40.

Further cutting of workpieces 46 gradually increases the amount of cutting chips and metal particles in the slurry. This degrades the cutting capability of the slurry. Therefore, in the same manner as in the first embodiment, during the predetermined cycle of the cutting process (e.g., the second cycle), some of the used slurry in the slurry tank 45 is replaced with fresh slurry to regenerate the slurry.

The slurry waste discharged from the slurry tank 45 of the wire saw W is first collected in the waste tank 5. When the slurry waste reaches a predetermined amount, the valves V41, V101 are closed and the valves VS, V107 are opened. The pumps P5, P61 and the ultrasonic oscillator 106 are then activated. It is preferred that the pump PS conveys the slurry waste at a pressure of about 0.5 kg/cm$^2$. It is also preferred that the pump P61 conveys the dispersing liquid, which includes the impurities, at a flow rate of 1 to 2 liters per minute. It is also preferred that the ultrasonic oscillator 106 generates ultrasonic waves having a frequency of about 40 Hz.

Figure 10A:
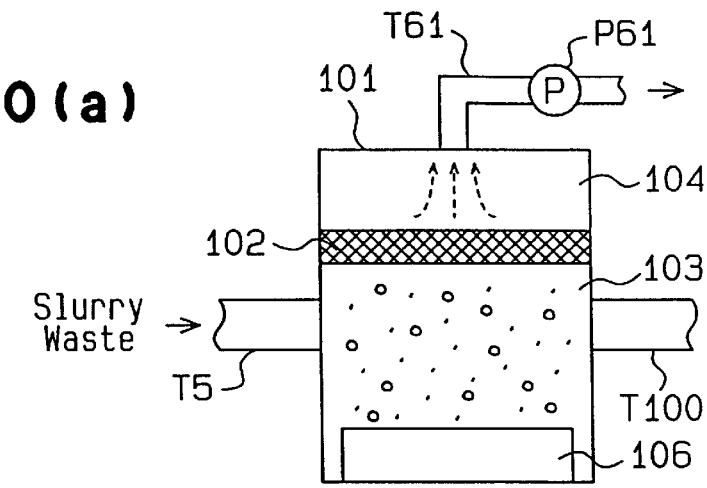
FIG. 10(a) is a schematic view showing the operation of the separating apparatus of FIG. 9.

As shown in FIG. 10(a), activation of the pump P5 causes the slurry waste in the waste tank 5 to be sent to the first chamber 103 of the separating apparatus 100 through the pipe T5. When the slurry waste in the first chamber 103 reaches a predetermined amount, the pump P61 draws the dispersing liquid in the slurry waste into the second chamber 104 through the filter 102, as shown by the broken lines in FIG. 10(a).

Figure 10B:
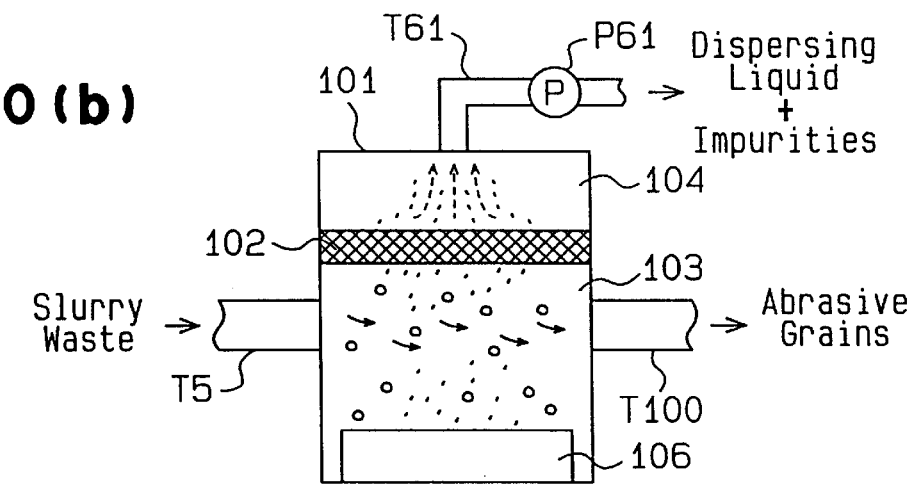
FIG. 10(b) is a schematic view showing the operation of the separating apparatus of FIG. 9.

The pump P61 also draws the abrasive grains and impurities toward the filter 102. As shown in FIG. 10(b), impurities having a grain diameter that is smaller than the pores of the filter 102 pass through the filter 102 together with the dispersing liquid into the second chamber 104. Abrasive grains that have a grain diameter larger than the diameter of the pores in the filter 102 are restricted from passing through the filter 102 and thus remain in the first chamber 103. When the slurry waste in the first chamber 103 reaches a predetermined value, the abrasive grains are forced out into the pipe T100 together with the slurry waste and returned to the waste tank 5.

Figure 11:
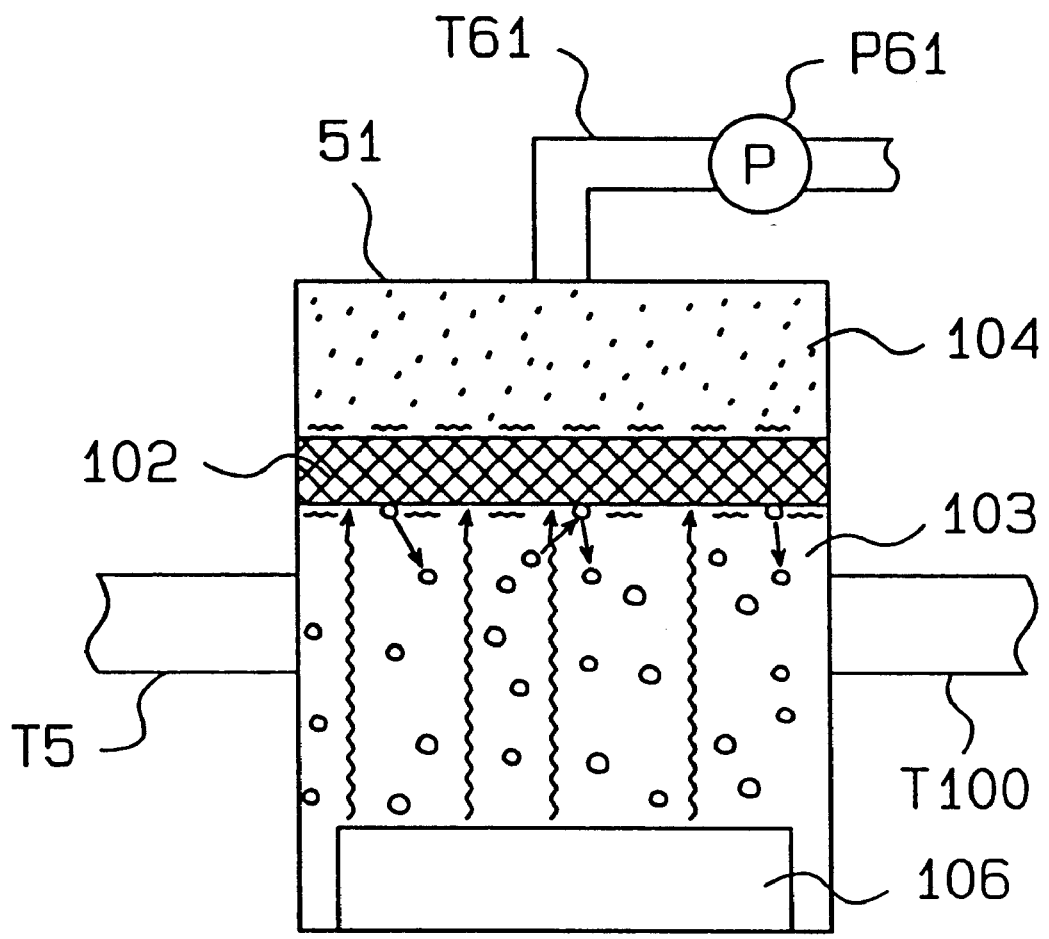
FIG. 11 is a schematic view showing the operation of the separating apparatus of FIG. 9.

The ultrasonic waves generated by the ultrasonic oscillator 106 are transmitted to the filter 102 through the slurry waste in the first chamber 103. This vibrates the filter 102 with an extremely small amplitude. Accordingly, as shown in FIG. 11, the abrasive grains are shaken from and prevented from adhering to the filter 102.

The impurities are smaller than the pores of the filter 102 but become trapped as they pass through the filter 102 since the filter 102 is formed by superimposing a plurality of screens. However, the ultrasonic waves from the ultrasonic oscillator 106 shake out the trapped impurities and allow them to pass through the filter 102. This prevents the impurities from being trapped in the filter 102.

The vibration of the filter 102 prevents abrasive grains from adhering to the surface of the filter 102 and prevents impurities from being trapped in the filter 102. Thus, the pores of the filter 102 are not clogged. Therefore, the impurities pass through the filter 102 smoothly with the dispersing liquid, which enables quick separation of the impurities.

Figure 10C:
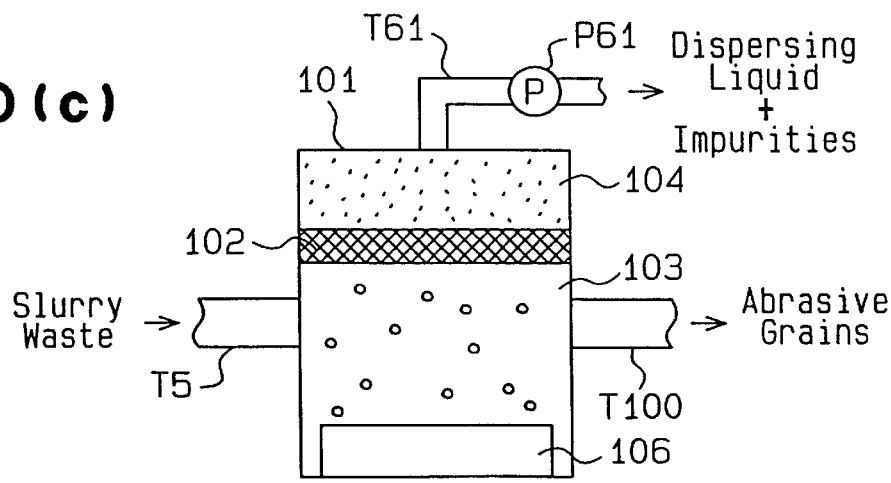
FIG. 10(c) is a schematic view showing the operation of the separating apparatus of FIG. 9.

As described above, slurry waste circulates through a circulation passage including the waste tank 5, the pipe T5, the separating apparatus 100, and the pipe T100. As the slurry waste advances along the passage, the percentage content of the abrasive grains in the slurry waste contained in the first chamber 103 of the separating apparatus 100 becomes larger while the percentage content of the impurities becomes smaller, as shown in FIG. 10(c). Therefore, after the circulation of the slurry waste is continued for a predetermined time period, the valve 101 is opened to convey the abrasive grains in the first compartment 103 toward the abrasive grain tank 108 through the pipe T101. This process is terminated when a predetermined time period elapses. Afterward, the ultrasonic oscillator 106 is deactivated.

The dispersing liquid and impurities that pass through the filter 102 enter the second chamber 104 and are sent to filter 107 through the pipe T61 by the pump P61. The filter 107 blocks impurities, which include the cutting chips, fragmented abrasive grains, and metal particles, and thus recovers the liquid. The dispersing liquid recovered by the filter 107 is sent to the liquid tank 109 through the pipe T107.

The abrasive grains collected in the grain tank 108 and the dispersing liquid collected in the liquid tank 109 are conveyed to the preparing tank 2. As shown by the double-dashed broken line in FIG. 8, the abrasive grains in the grain tank 108 and the dispersing liquid in the liquid tank 109 may be transferred to the preparing tank 2 through the first pipe T6 and the second pipe T7 in the manner of the first embodiment. The system may be designed such that the recovered abrasive grains and dispersing liquid are transferred manually to the preparing tank 2. Furthermore, the transferring may be carried out continuously or intermittently.

In the same manner as in the first embodiment, the opening of the valves V21, V22 is controlled based on the values detected by the specific gravity gage S1 and the viscosity gage S2. This enables adjustment of the amount of abrasive grains fed from the hopper 21 and the amount of dispersing liquid supplied from the liquid tank 22. As a result, the mixed weight ratio of the abrasive grains and the dispersing liquid in the slurry is adjusted so that it is maintained within the range of 1:0.91 to 1:0.6 if the liquid is oleaginous, and within the range of 1:0.76 to 1:0.5 if the liquid aqueous.

In the fourth embodiment, the filter 102 is vibrated by the ultrasonic waves generated by the ultrasonic oscillator 106 when separating the impurities from the slurry waste. This unclogs the filter 102 and maintains the straining function of the filter 102. Accordingly, impurities are readily and efficiently separated to recover the abrasive grains, even when slurry having a high viscosity is used.

The separating apparatus 100 is constituted mainly by the container 101, the filter 102, and the ultrasonic oscillator 106. This structure is simpler than the decanter 6 of the first embodiment. Thus, the production costs are lower. Accordingly, the production costs of the entire system are lower.

The diameter of the pores in the filter 102 and the flow rate of the dispersing liquid passing through the filter 102 may be adjusted to adapt the separating apparatus 100 to the size and amount of the subject to be separated or in accordance with the processing capacity of the system. Thus, the system may be rearranged flexibly. The advantages of the above embodiments also result in this embodiment.

The ultrasonic oscillator 106 may be activated continuously or intermittently when the impurities are separated from the slurry waste.

The length of time during which slurry waste circulates through the circulation passage defined along the waste tank 5, the pipe T5, the separating apparatus 100, and the pipe T100 may be varied in accordance with the target recovery rate and percentage content of the abrasive grains, or the like. The structure of the system may also be designed to convey the slurry waste that includes the abrasive grains directly to the grain tank 108 without returning it to the waste tank 5.

Fifth Embodiment

Figure 12:
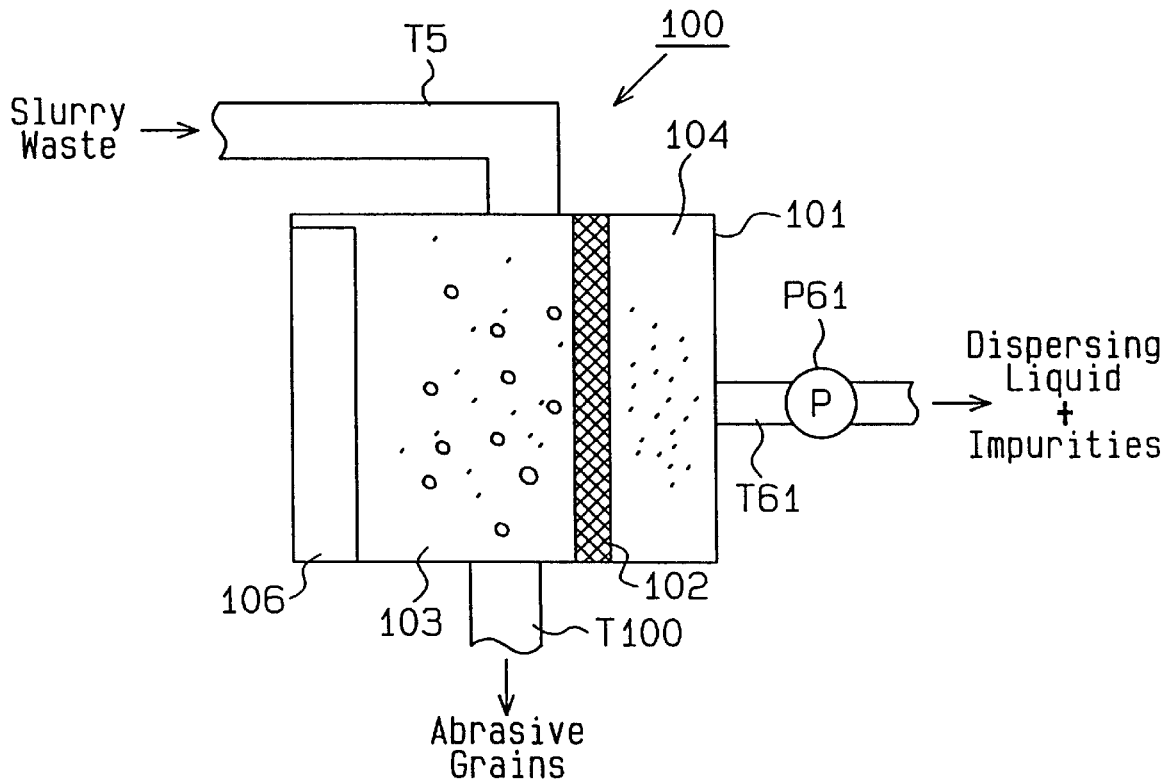
FIG. 12 is a diagrammatic view of a separating apparatus employed in a fifth embodiment according to the present invention.

A fifth embodiment according to the present invention will hereafter be described with reference to FIG. 12.

The fifth embodiment is a modification of the separating apparatus 100 of the fourth embodiment. As shown in FIG. 12, the separating apparatus of the fifth embodiment is arranged side to side. More specifically, the filter 102 partitions the interior of the container 101 so as to define the first chamber 103 and the second chamber 104 at the left and right sides of the filter 102. The pipe T5, through which slurry waste is supplied into the first chamber 103, is connected to the upper side of the container 101. The pipe T100, from which slurry waste including the abrasive grains in the first chamber 103 is discharged, is connected to the lower side of the container 101.

In the fifth embodiment, the slurry waste from the waste tank 5 may be drawn into the pipe T100 through the first chamber 103 by using the pump P5 or by allowing gravitational force to pull the slurry toward the pipe T100.

Sixth Embodiment

Figure 13:
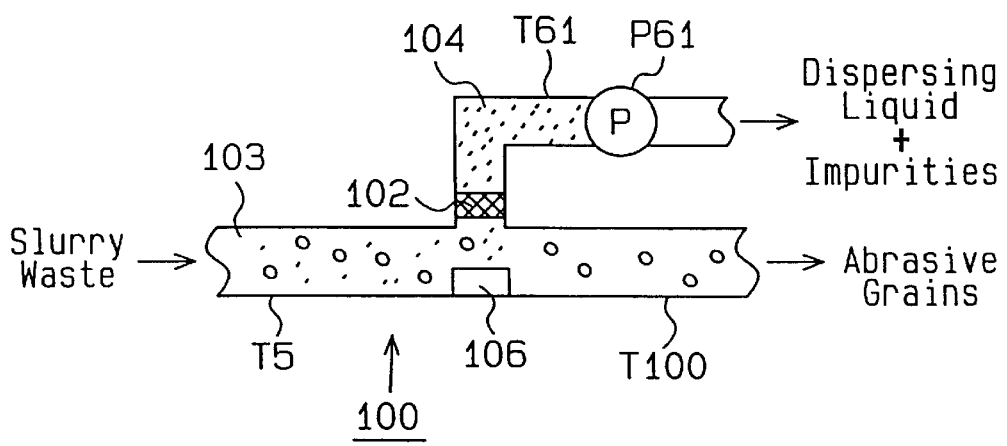
FIG. 13 is a diagrammatic view of a separating apparatus employed in a sixth embodiment according to the present invention.

A sixth embodiment according to the present invention will hereafter be described with reference to FIG. 13.

The sixth embodiment is a modification of the separating apparatus 100 employed in the fourth embodiment. As shown in FIG. 13, the separating apparatus 100 of the sixth embodiment has a main body formed by the pipe T5 and the pipe T61, which extends from the pipe T5. The filter 102 is arranged in the pipe T61. The ultrasonic oscillator 106 is arranged in the pipe T5 at a position opposed to the filter 102. The section of the pipe T5 downstream from the intersection with the pipe T61 serves as the pipe T100, through which abrasive grains are discharged. The section of the pipe T5 upstream from the intersection with the pipe T61 serves as the first chamber 103. The section of the pipe T61 downstream from the filter 102 serves as the second chamber 104.

The slurry waste in the waste tank 5 is sent to the pipe T5 through the pipe T5 by the pump P5. The pump P61 then draws the dispersing liquid and the impurities through the filter 102 and into the pipe T61. The slurry waste that includes the abrasive grains is discharged into the pipe T100.

Seventh Embodiment

Figure 14:
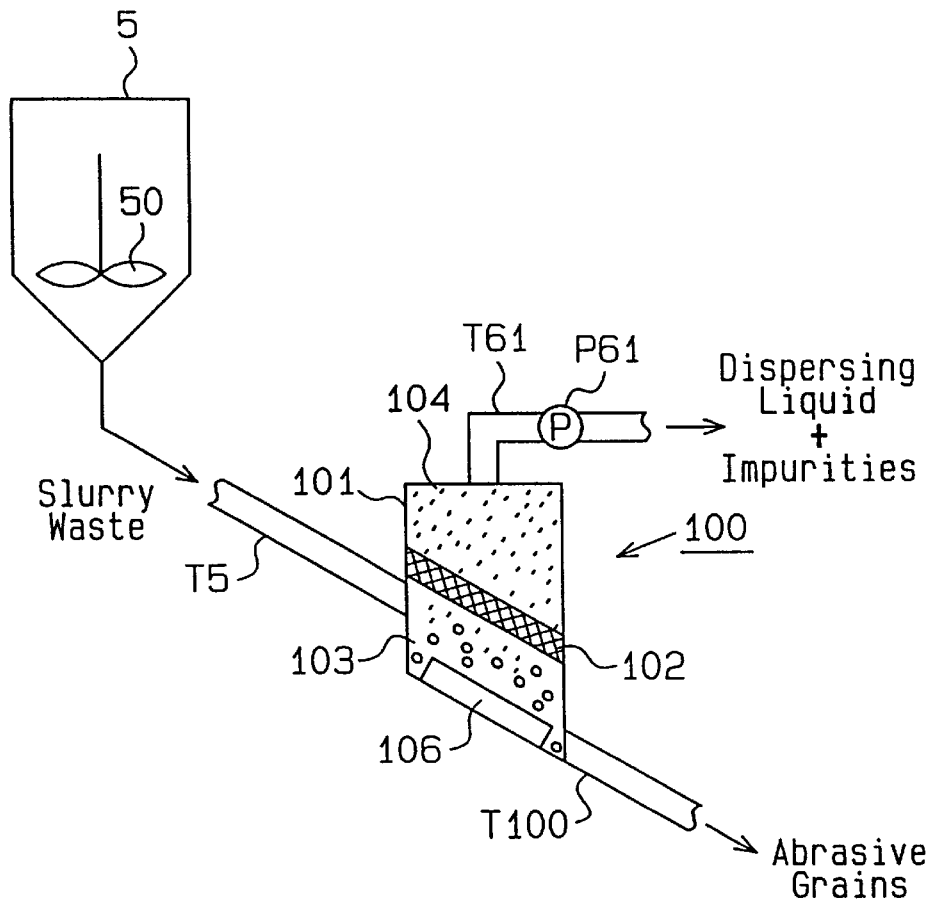
FIG. 14 is a diagrammatic view of a separating apparatus employed in a seventh embodiment according to the present invention.

A seventh embodiment according to the present invention will hereafter be described with reference to FIG. 14.

The seventh embodiment is a modification of the separating apparatus 100 employed in the fourth embodiment. As shown in FIG. 14, the separating apparatus 100 of the seventh embodiment is located at a position lower than the waste tank 5. The pipe T5 connecting the waste tank to the separating apparatus 100 is inclined downward. The pipe T100, the bottom of the first chamber 103, the ultrasonic oscillator 106, and the filter 106 are all inclined downward in the same manner as the pipe T5.

Gravitational force pulls the slurry waste in the waste tank 5 into the first chamber 103 through the pipe T5 and then out of the chamber 103 into the pipe T100. The slurry waste may also be drawn into the pipe T100 from the first chamber 103 by the pump P5.

Eighth Embodiment

Figure 15:
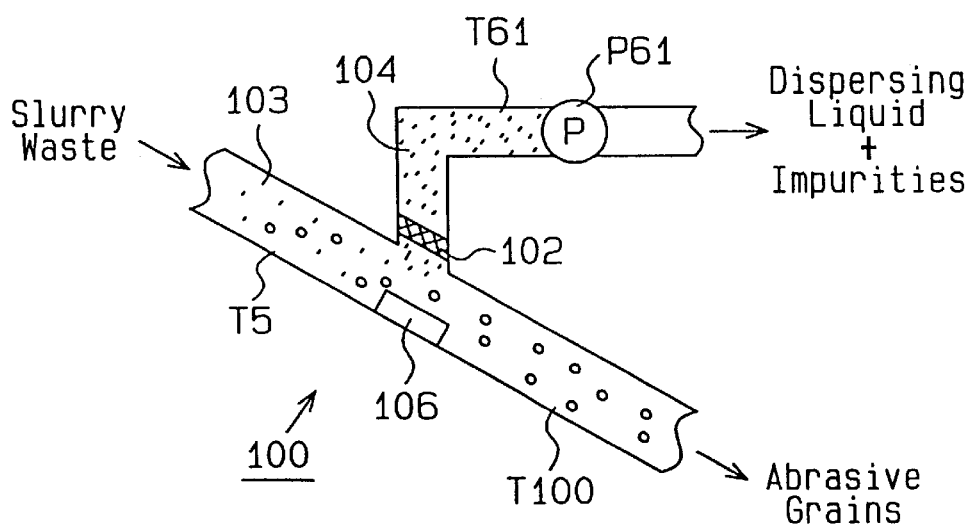
FIG. 15 is a diagrammatic view of a separating apparatus employed in an eighth embodiment according to the present invention.

An eighth embodiment according to the present invention will hereafter be described with reference to FIG. 15.

The eighth embodiment is a combination of the separating apparatus 100 employed in the sixth and seventh embodiments. As shown in FIG. 15, the structure of the separating apparatus 100 employed in the eighth embodiment is basically the same as that employed in the sixth embodiment. This embodiment differs from the sixth embodiment in that the pipe T5 is inclined downward from the waste tank 5 to the separating apparatus 100. In the same manner as in the seventh embodiment, gravitational force pulls the slurry waste in the waste tank 5 into the first chamber 103 through the pipe T5 and then out of the chamber 103 into the pipe T100.

Ninth Embodiment

A ninth embodiment according to the present invention will hereafter be described with reference to FIGS. 16 to 18. Parts identical to those used in the first embodiment will be denoted with the same numerals and will not be described.

The abrasive grains included in the slurry scatter during cutting and adhere to various parts of the wire saw. Therefore, the wire saw is washed periodically by a washing liquid. However, during the washing, the abrasive grains adhered to the wire saw are disposed of together with the washing liquid. This necessitates replacing the lost abrasive grains and increases the amount of abrasive grains required for cutting. As a result, the running cost increases due to the cost of the abrasive grains.

The ninth embodiment recovers the abrasive grains included in the washing liquid after washing the wire saw and recycles the abrasive grains so they may be used for cutting. As shown in FIG. 16, the hopper 21, which feeds abrasive grains to the preparing tank 2, is connected to the tank 2 by the screw feeder 21a and the pipe T21, which is provided with the valve V21. The dispersing liquid tank 22, which supplies dispersing liquid to the preparing tank 2, is connected to the tank 2 by the pipe T22, which is provided with the valve V22. The dispersing liquid is, for example, aqueous and includes a predetermined amount of a dispersing agent to improve the dispersion of the abrasive grains. The specific gravity gage S1 and the viscosity gage S2 are arranged in the preparing tank 2 to measure the specific gravity and viscosity of the slurry. The controller C1 transmits command signals to control the opening of the valves V21, V22 based on the values detected by the specific gravity gage S1 and the viscosity gage S2.

The preparing tank 2 is connected to the slurry tank 45 of the wire saw W by the pipe T2, which is provided with the valve V2. More than one wire saw may be employed. The wire saw W has a structure similar to that of the wire saws W1–W4 employed in the first embodiment. Thus, identical parts are denoted with the same reference numeral used in the first embodiment and will not be described here.

Figure 17:
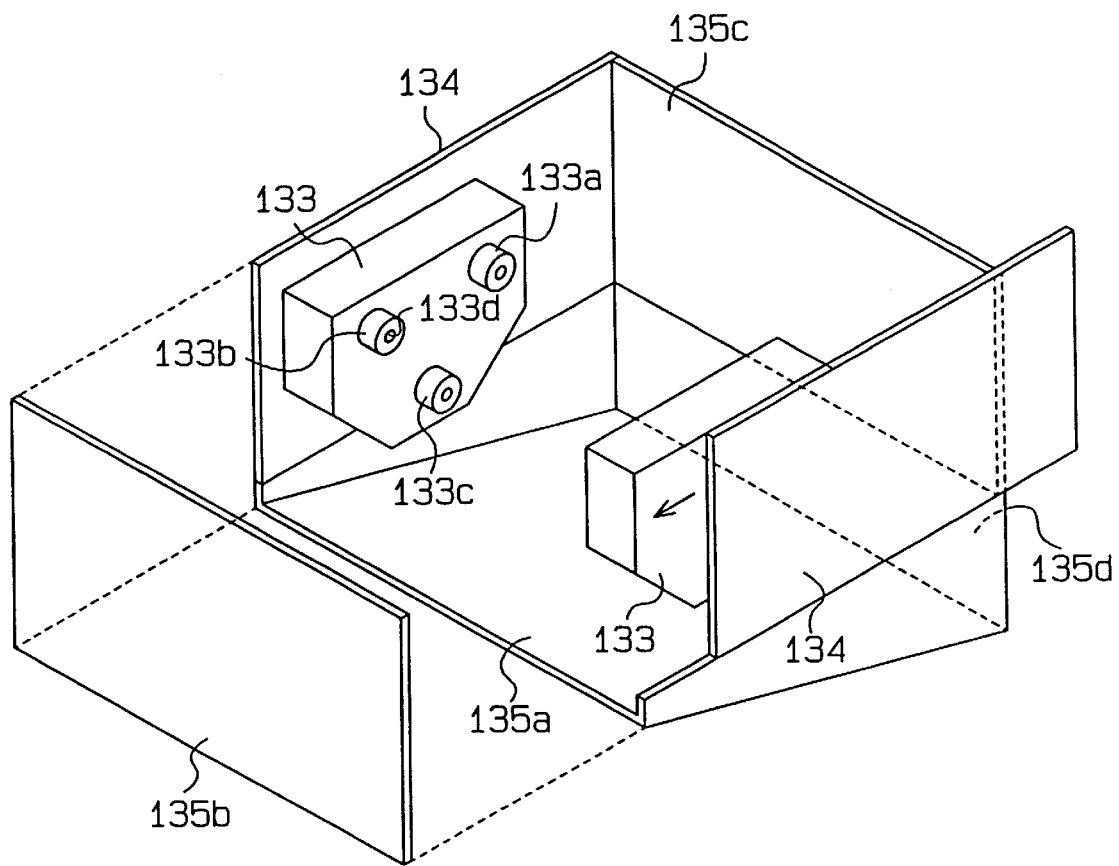
FIG. 17 is a perspective view showing the structure of the shutters and the support units employed in the wire saw of FIG. 16.
Figure 18:
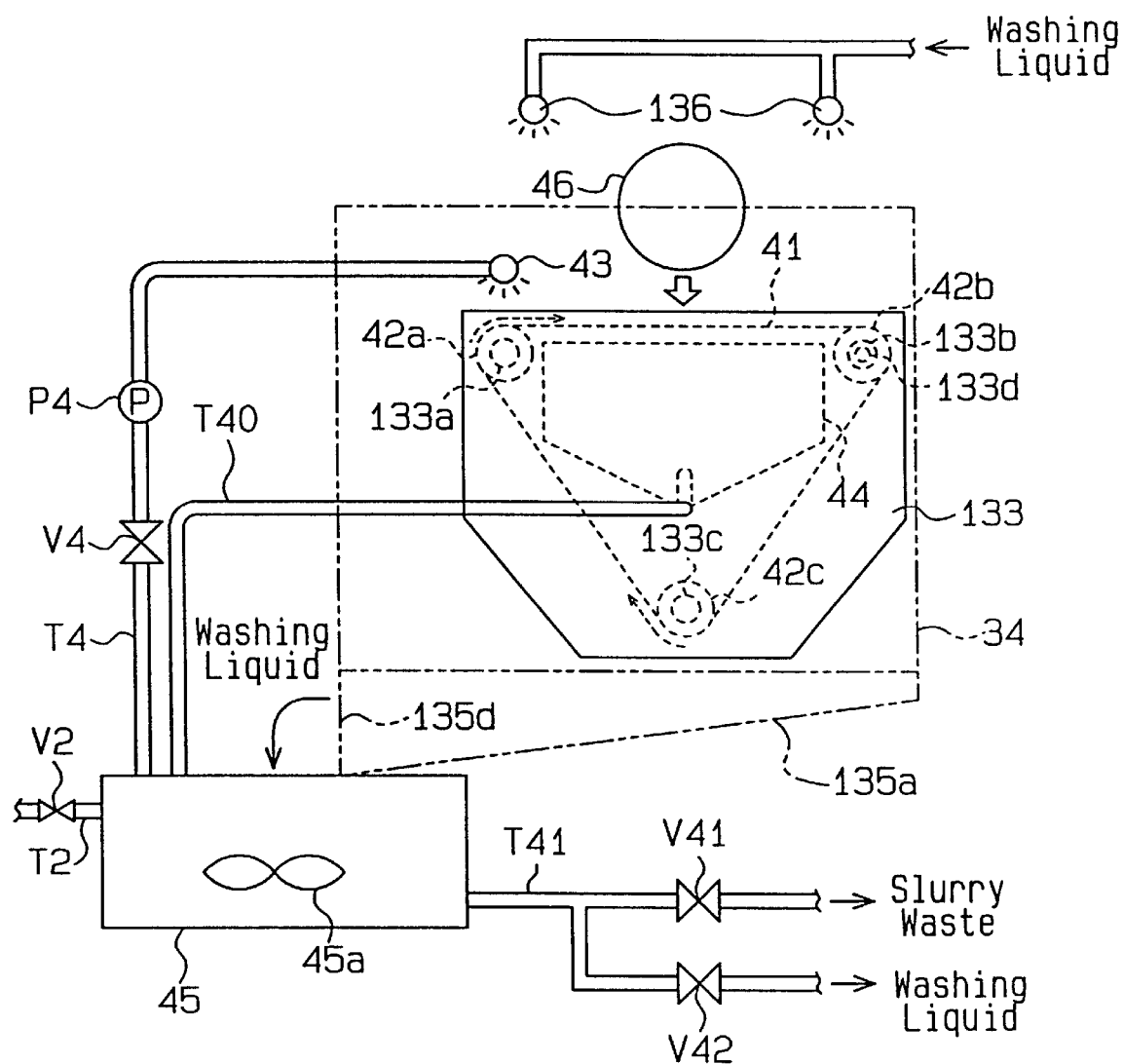
FIG. 18 is a schematic view showing the wire saw of FIG. 16 and its peripheral structure.

As shown in FIGS. 17 and 18, the wire saw W has a pair of support units 133 fixed to a frame (not shown). Each of the support units 133 includes three supporters 133a, 133b, 133c. The wire saw W has three rollers 42a, 42b, 42c, which are supported rotatably by the supporters 133a, 133b, 133c, respectively, between the two support units 133. The supporter 133b of one of the support units 133 also functions as the drive shaft 133d and is connected to the roller 42b, which is supported by the supporter 133b. The roller 42b is rotated by the drive shaft 133d, which is driven by a motor (not shown). The rotation of the roller 42b is transmitted to the other rollers 42a, 42c through the wire 40.

A receiving plate 135a, which receives the washing liquid after it washes the various parts of the wire saw W, is inclined downward with respect to the rear side of the wire saw W (left side as viewed in FIG. 18). The sides of the receiving plate 135a are bent upward and the upper edge of the bent section extends horizontally. A pair of shutters 134 are each supported slidably in the horizontal direction on the upper edge of one of the bent sections. The shutters 134 are arranged at the sides of the wire saw W to surround the support units 133.

A front plate 135b is arranged at the front side of the receiving plate 135a. The front plate 135b is supported to move freely toward and away from the receiving plate 135a and to close and open the front side. A rear plate 135c is arranged at the rear side of the receiving plate 135a. The vertical length of the rear plate 135c is the same as that of the shutters 134. The rear plate 135c is arranged so that its upper edge extends along an imaginary plane defined by connecting the upper edges of the shutters 134. An opening 135d, through which washing liquid is discharged, is defined between the rear plate 135c and the receiving plate 135a. The shutters 134, the receiving plate 135a, the front plate 135b, and the rear plate 135c encompass the cutting area of the wire saw W.

A pair of washing pipes 136 are provided above the shutters 134. The washing liquid is injected through holes (not shown) provided in the bottom of each pipe 136. The slurry tank 45 is arranged to collect the washing liquid discharged through the opening 135d. The slurry or washing liquid in the slurry tank 45 is discharged through the pipe T41 into the slurry waste tank 5 and washing liquid tank 137, respectively.

Figure 16:
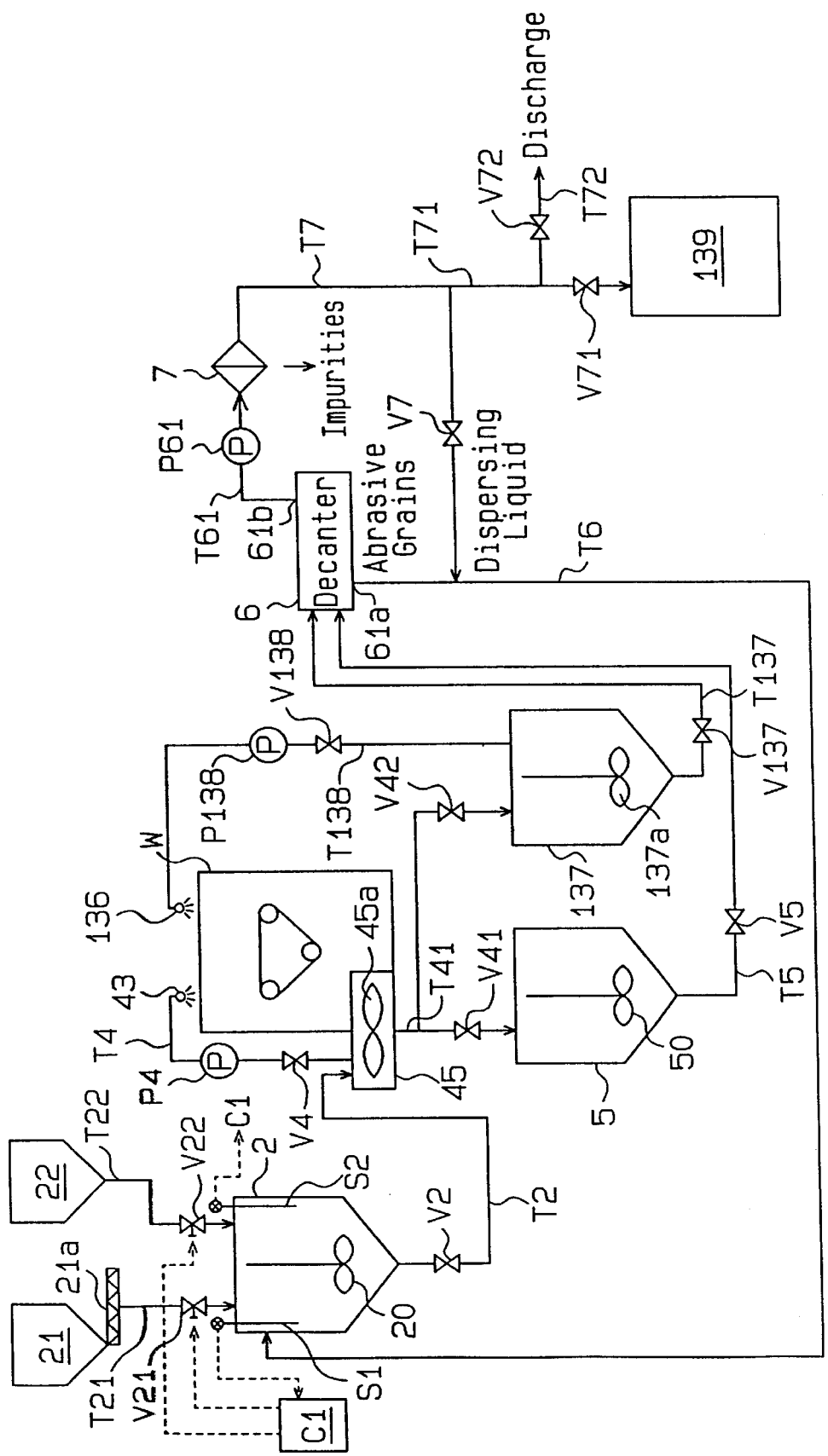
FIG. 16 is a schematic view showing the structure of a slurry managing system according to a ninth embodiment of the present invention.

As shown in FIG. 16, the pipe T41 includes a single inlet connected with the slurry tank 45 and two outlets, one connected to the waste tank 5 and the other to the washing liquid tank 137. The pipe T41 is provided with valves V41, V42. The valve V41 corresponds to the waste tank 5 and the valve V42 corresponds to the washing liquid tank 137. An agitator 137a is arranged in the washing liquid tank 137. The waste tank 5 is connected to the decanter 6, which serves as the first separating/recovering means, by the pipe T5, which is provided with the pump P5. The structure of the decanter 6 is the same as that of the first embodiment. The washing liquid tank 137 is connected to the washing pipes 136 by a pipe T138, which is provided with a valve V138 and a pump P138.

The decanter 6 has an abrasive grain discharge port 61a connected to the preparing tank 2 through the first pipe T6. The abrasive grains recovered in the decanter 6 are conveyed to the preparing tank 2 through the first pipe T6. In the same manner as in the first embodiment, the outlet 61b of the decanter 6 is connected to the filter 7, which serves as the second separating/recovering means. The structure of the filter 7 is the same as that of the first embodiment. The filter 7 is connected to the first pipe T6 by the second pipe T7, which is provided with the valve V7. Some of the dispersing liquid recovered by the filter 7 is conveyed to the preparing tank 2 through the second pipe T7. A cyclone may be employed as the first separating/recovering means and a decanter may be used as the second separating/recovering means.

The second pipe T7 is connected to a pipe T71 that is further connected with a dispersing liquid tank 139. A valve V71 is provided in the pipe T71. A pipe T72 is connected to a mid-section of the pipe T71. A valve V72 is provided in the pipe T72.

The operation of the ninth embodiment will now be described. The dispersing liquid employed here is aqueous.

In the manner of the first embodiment, the slurry is prepared in the preparing tank 2. The mixed weight ratio of the abrasive grains and the dispersing liquid in the slurry prepared in the tank 2 is set within the same range as that of the first embodiment. The prepared slurry is supplied to the slurry tank 45 of the wire saw W when the valve V2 is opened.

The wire saw W cuts each workpiece 46 in the manner of the first embodiment. More specifically, when the valve V4 is opened and the valves V2, V41, V42 are closed, the slurry in the slurry tank 45 is supplied to the wire group 41 through the supply pipes 43. In this state, the workpiece 46 is lowered through the traveling wire group 41 and sliced into a plurality of wafers.

After a predetermined number of cutting cycles are performed on the workpieces 46, some of the slurry in the slurry tank 45 is replaced and thus regenerated in the same manner as in the first embodiment.

The slurry waste discharged from the slurry tank 45 of the wire saw W is first collected in the waste tank 5 and then sent to the decanter 6. The decanter 6 separates the dispersing liquid and impurities that are smaller than the abrasive grains from the slurry waste to recover the abrasive grains. The recovered abrasive grains are sent to the first pipe T6. The dispersing liquid including the impurities are sent to the filter 7 through the pipe T61. The filter 7 separates the impurities from the dispersing liquid and recovers the dispersing liquid. Some of the recovered dispersing liquid is returned to the preparing tank 2 together with the abrasive grains through the second pipe T7 and the first pipe T6 when the valve V7 is opened and the valves V71, V72 are closed. The remaining dispersing liquid is sent to the dispersing liquid tank 139 through the pipe T71 when the valve V71 is opened and the valves V7, V72 are closed.

When each of the workpieces 46 are cut, the slurry is scattered toward the inner sides of the shutters 134, the receiving plate 135a, the front plate 135b, the rear plate 135c, and toward the support units 133 and the rollers 42a–42c. The scattered slurry dries as time elapses and the abrasive grains therein adhere to these parts. Further cutting causes the abrasive grains to accumulate gradually. Therefore, the wire saw W is washed periodically, for example, after a predetermined number of cutting cycles are performed.

More specifically, the washing is performed by opening the valves V42, V138, and closing the valves V2, V4, V41. In this state, the pump P138 sends the washing liquid (e.g., water) in the washing liquid tank to the washing pipes 136 through the pipe T138. The water is injected in a shower-like manner from the washing pipes 136 toward the inner sides of the shutters 134, the support units 133, the rollers 42a–42c, etc. This washes off the scattered slurry and the abrasive grains from these parts.

The abrasive grains washed from the various parts fall onto the receiving plate 135a together with the washing liquid. The washing liquid and the abrasive grains flow along the inclined surface of the receiving plate 135a through the opening 135d into the slurry tank 45. The washing liquid collected in the slurry tank 45 is sent to the washing liquid tank 137 through the pipe T41. When the washing liquid in the washing liquid tank 137 reaches a predetermined amount, the valve V137 is opened to send the washing liquid in the tank 137 to the decanter 6. The decanter 6 separates washing liquid and the impurities that are smaller than the abrasive grains from the abrasive grains. The abrasive grains are discharged into the first pipe T6. The washing liquid and the impurities are sent to the filter 7 through the pipe T61. The filter 7 separates the impurities from the washing liquid and recovers the washing liquid. Some of the recovered washing liquid (e.g., an amount of washing liquid that is required to convey the abrasive grains through the first pipe T6) is sent to the first pipe T6 through the second pipe T7 by opening the valve V7 and closing the valves V71, V72. Accordingly, the abrasive grains in the first pipe T6 are sent to the preparing tank 2 together with washing liquid. The remaining washing liquid is discharged from the pipe T72 by opening the valve V72 and closing the valves V7, V71.

In the above manner, the cutting process of the workpieces 46 and the washing process of the wire saw W is alternately repeated. Abrasive grains are recovered in each cycle of the cutting and washing processes. The recovered abrasive grains, the dispersing liquid, the washing liquid, the newly added abrasive grains and dispersing liquid are mixed in the preparing tank 2 to prepare fresh slurry. In the manner of the first embodiment, the opening of the valves V21, V22 is controlled based on the values detected by the specific gravity gage S1 and the viscosity gage S2, which are arranged in the tank 2. This adjusts the amount of abrasive grains fed from the hopper 21 and the amount of dispersing liquid supplied by the dispersing liquid tank 22. As a result, in this embodiment, the mixed weight ratio of the abrasive grains and the aqueous dispersing liquid in the slurry prepared in the tank 2 is adjusted to be within a range of 1:0.76 to 1:0.5.

When an aqueous dispersing liquid is included in the slurry, the abrasive grains adhered to parts such as the shutters 134 are easily washed off by the aqueous washing liquid. Furthermore, the area in which the slurry scatters is restricted by the shutters 134 and the like. Thus, the washing process of the wire saw W may be performed within a restricted area. Additionally, costs are saved by using water, which is inexpensive. Slurry including aqueous dispersing liquid scatters more easily and causes a larger amount of abrasive grains to be adhered to various parts in comparison with a slurry including oleaginous dispersing liquid. However, the washing is performed more efficiently when using aqueous dispersing liquid.

The abrasive grains recovered from the washing liquid used to wash the wire saw W are recycled and employed to cut the workpieces 46. This reduces the cost of the cutting process. Furthermore, the washing is carried out within the slurry scattering area restricted by the shutters 134 and the like. Since the abrasive grains that adhere to the various parts of the wire saw W are restricted within the scattering area, the abrasive grains may easily be recovered. This improves the recovery rate of the abrasive grains. The washing liquid includes water, which is also the main constituent of the dispersing liquid. This conveys the abrasive grains recovered by the decanter 6 to the preparing tank 2 with the washing liquid.

The ninth embodiment may also be applied to a system that employs slurry including an oleaginous dispersing liquid. In this case, for example, machine oil is used as the washing liquid to wash the wire saw W. The decanter 6 separates and recovers the abrasive grains from the machine oil and sends the abrasive grains to the preparing tank 2 together with the dispersing liquid. This structure also allows the expensive abrasive grains, which are not recovered during cutting, to be recovered and saves costs. If oleaginous dispersing liquid is used, the mixed weight ratio of the abrasive grains and the dispersing liquid in the slurry is adjusted so that it is maintained within the range of 1:0.91 to 1:0.6.

The system may be constructed to recover the abrasive grains from the washing liquid and send only the recovered abrasive grains directly to the preparing tank 2. The system may also be constructed to collect the recovered abrasive grains before sending them to the preparing tank 2.

Tenth Embodiment

A tenth embodiment according to the present invention will now be described with reference to FIGS. 19 to 23.

Figure 19:
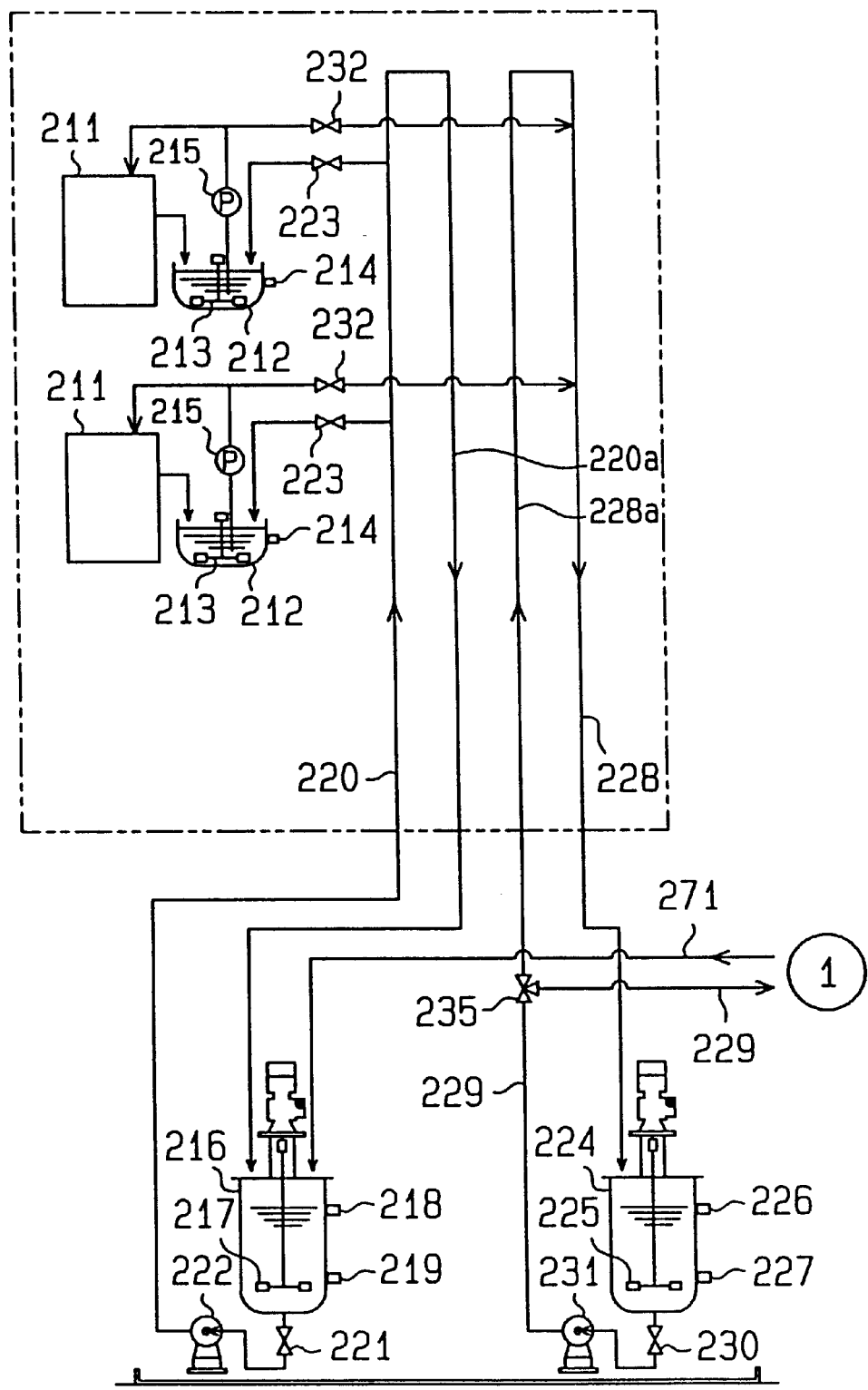
FIG. 19 is a diagrammatic view showing part of a slurry managing system according to a tenth embodiment of the present invention.
Figure 20:
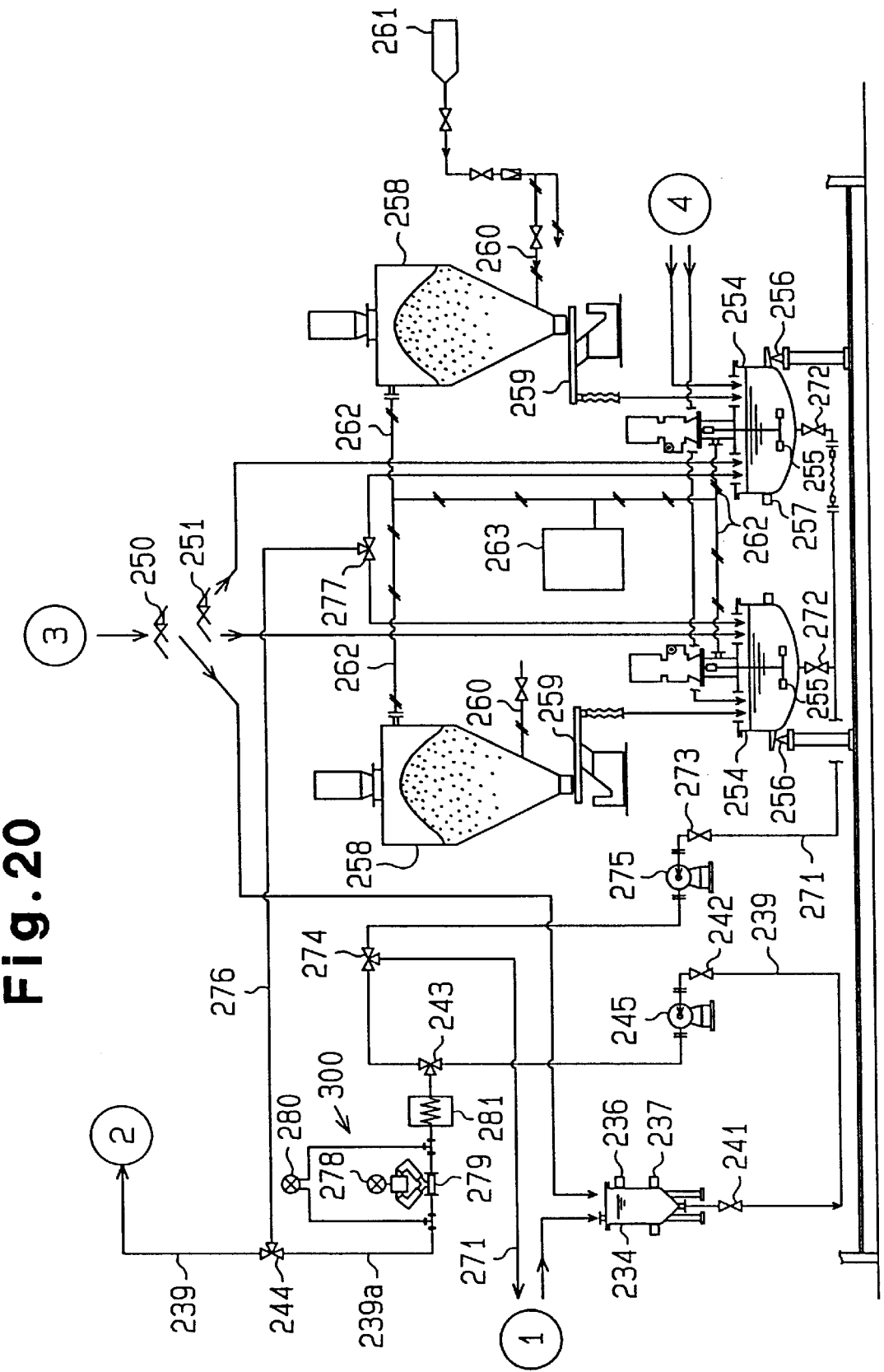
FIG. 20 is a diagrammatic view showing part of a slurry managing system of the tenth embodiment.
Figure 21:
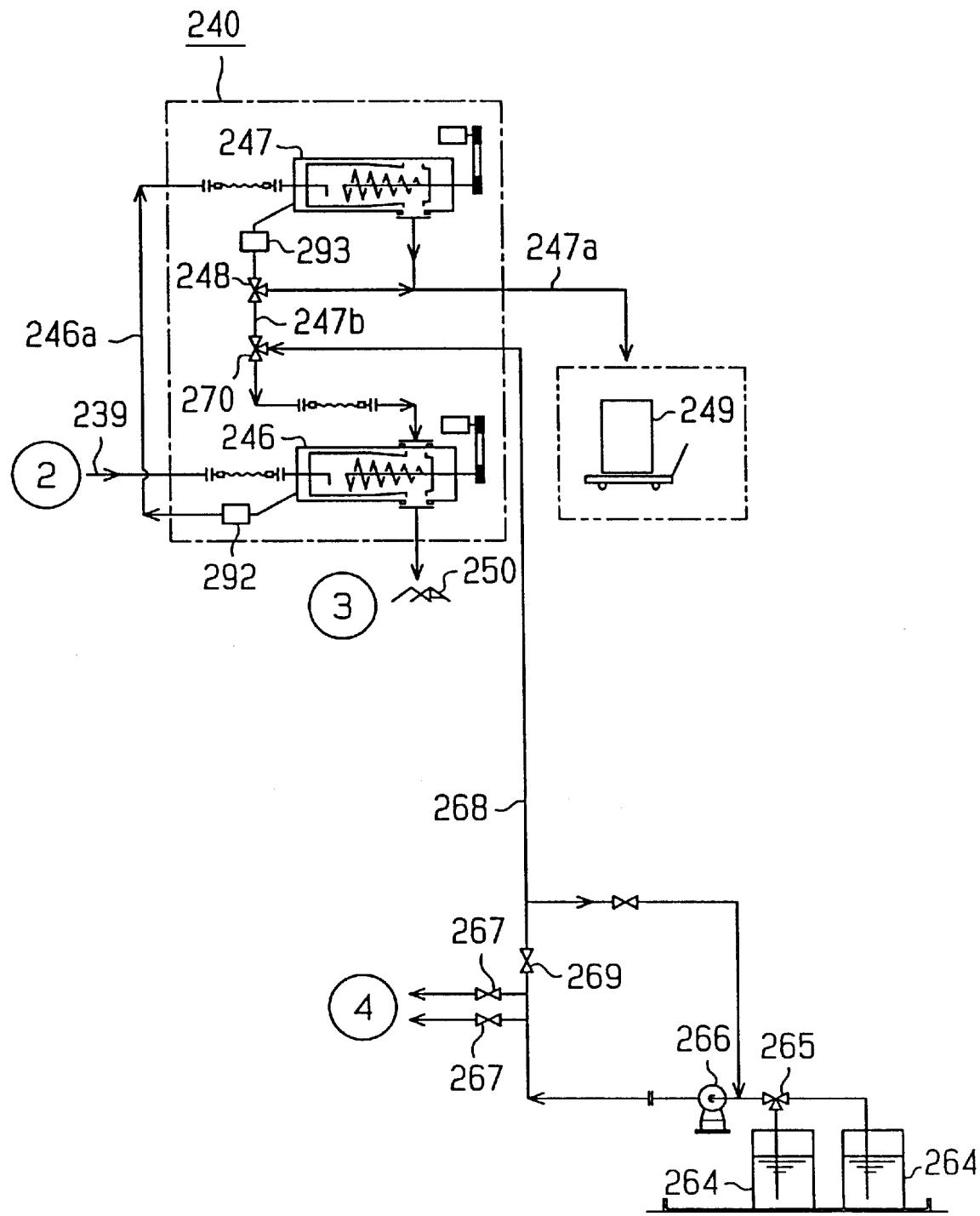
FIG. 21 is a diagrammatic view showing part of a slurry managing system of the tenth embodiment.

The entire structure of the slurry managing system is shown in FIGS. 19 to 21. As shown in FIG. 19, the managing system includes a plurality of wire saws 211 (two shown in the drawing). Each wire saw 211 has a slurry tank 212, which houses a rotatable agitator 213. A level sensor 214 is attached to the outer side of the slurry tank 212 to detect the liquid level of the slurry in the tank 212. A predetermined amount of slurry, which contains, for example, oleaginous dispersing liquid and abrasive grains is reserved in the slurry tank 212. The slurry in the tank 212 is sent to the associated wire saw 211 by a pump 215. The slurry used for cutting by the wire saw 211 is recovered by the associated tank 212. The recovered slurry is then sent to the wire saw again. In this manner, the slurry is used repeatedly. The wire saw 211 has substantially the same structure as the wire saw illustrated in FIGS. 2 and 3.

The slurry supplied to the wire saw 211 is reserved in a supply tank 216, which is arranged near the wire saws 211. The supply tank 216, which corresponds to the reserve tank 3 of the first embodiment, sends slurry to the two slurry tanks 212 through a supply passage 220. A rotatable agitator 217 is accommodated in the supply tank 216. Two level sensors 218, 219 are attached to the outer side of the supply tank 216 to detect the liquid level of the slurry in the supply tank 216. A valve 221 and a pump 222 are arranged at the upstream end of the supply passage 220. The slurry in the supply tank 216 is supplied to each slurry tank 212 from the supply passage 220 through a valve 223. The supply passage 200 is connected to a recovery passage 220a, through which slurry is returned to the supply tank 216 from the supply passage 220.

A recovery tank 224 is arranged adjacent to the supply tank 216. The recovery tank 224 corresponds to the slurry waste tank 5 of the first embodiment. A rotatable agitator 225 is housed in the recovery tank 224. Two level sensors 226, 227 are attached to the outer side of the recovery tank 224 to detect the liquid level of the slurry in the recovery tank 224. The recovery tank 224 is connected to a recovery passage 228, through which slurry is recovered from the slurry tank 212, and a conveying passage 229, through which the recovered slurry is sent to a separating/recovering mechanism 240, which will be described later. A valve 230 and a pump 231 are arranged at the upstream end of the conveying passage 229. All or some of the used slurry in each slurry tank 212 is sent to the recovery tank 224 through the pump 215, the valve 232, and the recovery passage 228 periodically or each time cutting is completed.

The supply tank 216 replenishes each slurry tank 212 with fresh slurry in accordance with the amount of used slurry discharged from the slurry tank 212. A circulation passage 228a extends between the recovery passage 228 and a valve 235, which is arranged in the conveying passage 229. Thus, slurry circulates through the recovery tank 224, the conveying passage 229, the circulation passage 228a, and the recovery passage 228.

The conveying passage 229 is connected to a metering tank 234, which is shown in FIG. 20. The used slurry in the recovery tank 224 is sent into the metering tank 234 through the valve 230, which is located in the conveying passage 229, the pump 231, and the valve 235. A pair of level sensors 236, 237 are attached to the outer side of the metering tank 234 to detect the liquid level of the slurry in the tank 234. The level sensors 236, 237 are used during a slurry separation process, which will be described later, to meter the amount of used slurry treated during the execution of each separation process.

The metering tank 234 is connected to the separating/recovering mechanism 240, which is shown in FIG. 21, by a transfer passage 239. The transfer passage 239 includes a plurality of valves 241, 242, 243, 244 and a pump 245. When the used slurry on the metering tank 234 is transferred to the separating/recovering mechanism 240 through the transfer passage 239, the separating/recovering mechanism 240 removes impurities from the used slurry and recovers the recyclable abrasive grains and dispersing liquid. The impurities refer to fine grain components having a smaller size than the abrasive grains, such as workpiece cutting chips and fragmented abrasive grains.

The separating/recovering mechanism 240 includes a first decanter 246, or first separating means, and a second decanter 247, or second separating means. For example, screw conveyor type centrifugal separators are used as the first and second decanters 246, 247. The rotating speed of the second decanter 247 is higher than that of the first decanter 246. The structure of the decanters 246, 247 is substantially the same as that of the decanter 6 shown in FIG. 4.

The first decanter 246 centrifuges the used slurry sent from the transfer passage 239 into, for example, recyclable abrasive grains having a grain diameter of five micrometers or more and a turbid dispersing liquid (hereafter referred to as primary separation liquid) that contains fine particle components, which are smaller than the recyclable abrasive grains. The primary separation liquid separated by the first decanter is sent to a second decanter 247 through a passage 246a. The secondary decanter 247 centrifuges the primary separation liquid into impurities and pure, recyclable dispersing liquid to recover a recyclable dispersing liquid (hereafter referred to as secondary separation liquid).

The impurities separated by the second decanter 247 are sent to a containment tank 249 through a discharge passage 247a. The secondary separation liquid recovered by the second decanter 247 is sent to the first decanter 246 through a passage 247b. Valves 248, 270 are arranged in the passage 247b. The abrasive grains recovered by the first decanter 246 is mixed with the secondary separation liquid sent from the second decanter 247 and sent to a first switching valve 250 by the first decanter 246. Thus, the abrasive grains, which are solids, are easily sent out.

A first detector 292 for detecting the properties of the primary separation liquid is arranged in the passage 246a. A second detector 293 for detecting the properties of the secondary separation liquid is arranged in the passage 247b. The first and second detectors 292, 293 each have a specific gravity gage 278 and a viscosity gage 279.

As shown in FIG. 20, a second switching valve 251 is arranged downstream the first switching valve 250. The mixture of the abrasive grains and the secondary separation liquid, which is sent out of the first decanter 246, is sent selectively to the second switching valve 251 and the metering tank 234 by the first switching valve 250. The mixture of the abrasive grains and the secondary separation liquid, which is drawn into the second valve 251, is sent selectively to a pair of preparing tanks 254.

Each preparing tank 254, which corresponds to the preparing tank 2 of the first embodiment, houses a rotatable agitator 255. A weight sensor 256 is attached to the outer side of the preparing tank 254. The weight sensor 256 detects the weight of the slurry in the preparing tank 254.

A hopper 258 containing fresh abrasive grains is arranged above each preparing tank 254. The hopper 258 corresponds to the hopper 21 of the first embodiment. The fresh abrasive grains in the hopper 258 are fed into the associated preparing tank 254 through an oscillating feeder 259. Each hopper 258 is connected to an air supply passage 260, which leads to an air compressor 261. When abrasive grains are fed into the preparing tanks 254, the air compressor 261 sends compressed air into the hoppers 258 to improve the feeding of the abrasive grains. The hoppers 258 and the preparing tanks 254 are connected to a dust collector 263 by a suction passage 262. The abrasive grains (mainly fine fragmented abrasive grains) entrained in the hoppers 258 and the preparing tanks 254 are drawn out by the dust collector 263.

A pair of dispersing liquid tanks 264, which are shown in FIG. 21, are arranged adjacent to the preparing tanks 254. The dispersing liquid tanks 264, which correspond to the dispersing liquid tank 22 of the first embodiment, contain fresh dispersing liquid. The fresh dispersing liquid in the dispersing liquid tanks 264 is sent to each preparing tank 254, shown in FIG. 20, through a valve 265, a pump 266, and a pair of valves 267. The fresh abrasive grains from the hopper 258 and the fresh abrasive grain from the dispersing liquid tank 264 are agitated and mixed with the abrasive grains and dispersing liquid from the separating/recovery mechanism 240 in each preparing tank 254. As a result, slurry is prepared with the abrasive grains and the dispersing liquid having a predetermined ratio. The preparation of the slurry is performed alternately by the two preparing tanks 254.

The mixture ratio between the abrasive grains and the dispersing liquid in the preparing tanks is approximately 1:0.6 to 1:0.98 by weight (and preferably 1:0.6 to 1:0.91 as mentioned in the description of the first embodiment). Grains made of a material such as silicon nitride or silicon carbide and having a size of, for example, #600, #800, or #1000, are used as the abrasive grains. Silicon oil (e.g., manufactured by Paresu Kagaku Kabushiki Kaisha, product number PS-LW-1) is used as the dispersing liquid.

As shown in FIG. 21, a valve 269 connects a bifurcating passage 268 to a supply passage, which extends from the dispersing liquid tank 264 to the preparing tank 254 of FIG. 20. The bifurcating passage 268 is connected to the passage 247b by way of the valve 270. The secondary separation liquid recovered by the second decanter 247, or the recyclable dispersing liquid, is periodically sent to the containment tank 249 through the discharge passage 247a from the valve 248. Simultaneously, the dispersing liquid in the dispersing liquid tank 264 is not only supplied to the preparing tank 254 but also sent to the first decanter 246 through the bifurcating passage 268 from the valve 270.

As shown in FIGS. 19 and 20, the preparing tanks 254 are connected to the supply tank 216 by a supply passage 271. As shown in FIG. 20, the portions of the supply passage 271 connected to the two preparing tanks 254 are each provided with a valve 272. Valves 273, 274 and a pump 275 are also arranged in the supply passage 271. The slurry prepared in each preparing tank 254 is sent to the supply tank 216 through the supply passage 271.

A circulation passage 276 extends from the valve 274 of the supply passage 271 toward the two preparing tanks 254. The transfer passage 239 includes a common passage 239a, which also functions as the circulation passage 276, extending between the valves 243, 244. The circulation passage 276 is bifurcated by a valve 277 to extend toward each of the two preparing tanks 254. During preparation and after preparation of the slurry in the two preparing tanks 254, the slurry in the preparing tanks 254 is circulated through part of the supply passage 271 and through the circulation passage 276 by the pump 275.

A detector 300 is arranged in the common passage 239a to detect the properties of the slurry passing through the passage 239a. The detector 300 includes a specific gravity gage 278, a flow rate gage 279, and a viscosity gage 280.

When used slurry is transferred to the separating/recovering mechanism 240 through the valve 243 and the transfer passage 239 or when the slurry in the preparing tanks 254 is circulated through part of the supply passage 271 and the circulation passage 276, the slurry's specific gravity, flow rate, and viscosity are detected by the specific gravity gage 278, the flow rate gage 279, and the viscosity gage 280, respectively.

A gage incorporating both specific gravity and flow rate gages 278, 279 may be employed. For example, a micromotion flow meter (manufactured by Kabushiki Kaisha Ohbaru), which simultaneously detects the specific gravity and flow rate of a liquid, may be employed. A pressure/differential-pressure transmitter 3051C (manufactured by Fisher-Rosemount Japan Kabushiki Kaisha) may be employed as the viscosity gage 280.

A temperature adjustor 281 is arranged in the common passage downstream of the detector 300. The temperature adjustor 281 heat or cools slurry by, for example, changing the temperature or flow rate of a heat medium for transferring heat to the slurry. When used slurry is transferred to the separating/recovering mechanism 240 through the transfer passage 239, the temperature adjustor 281 detects the temperature of the slurry. The temperature of the slurry reflects the nature, or viscosity, of the slurry.

Figure 22:
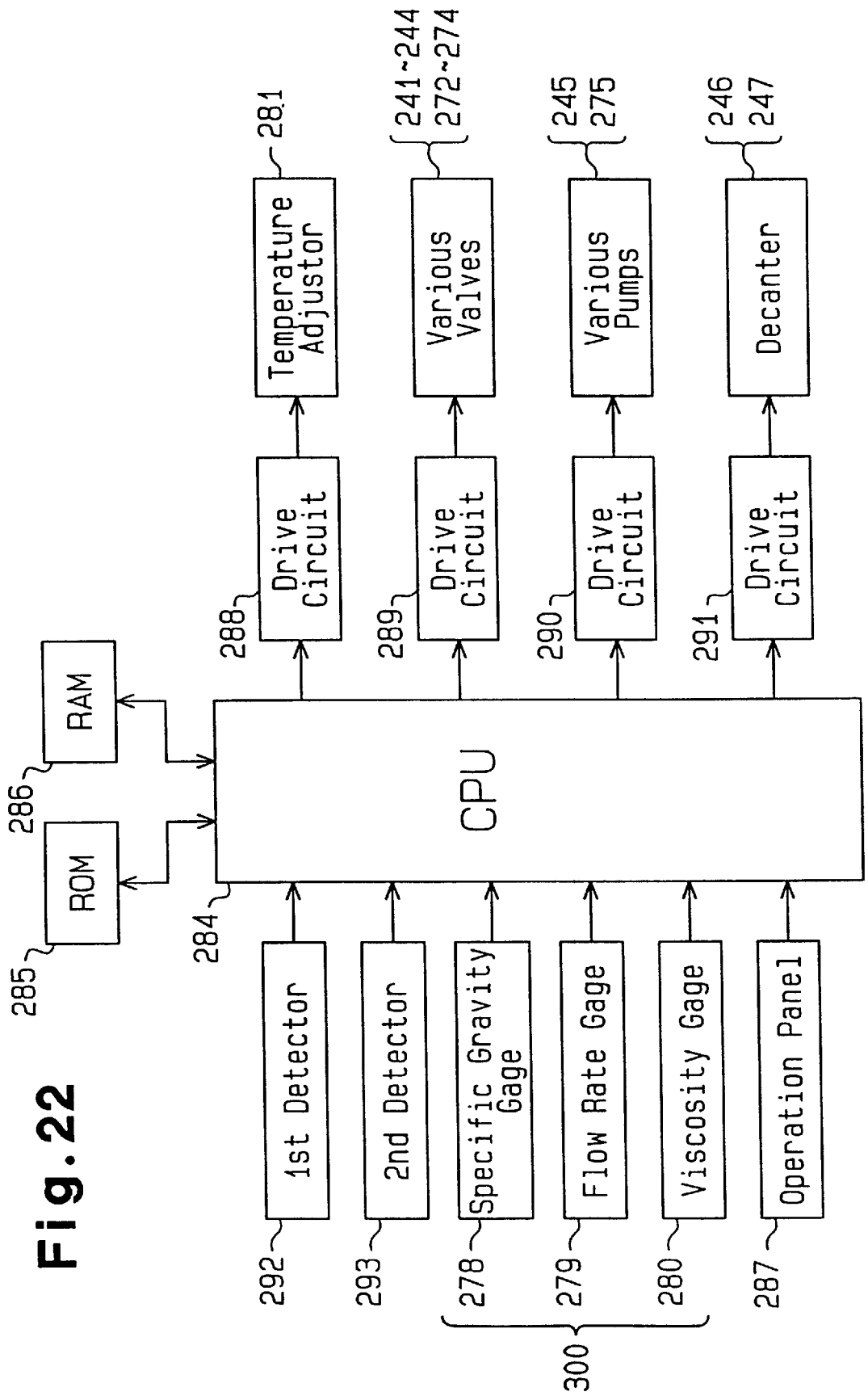
FIG. 22 is a block diagram showing the electric structure of the managing system of FIGS. 19 to 21.

The electric structure of the above slurry managing system will now be described. As shown in FIG. 22, a central processing unit (CPU) 284 controls operation of the entire slurry managing system. Various types of control programs that are necessary for the operation of the slurry control system are stored in a read only memory (ROM) 285. Data obtained during execution of the control programs is temporarily stored in a random access memory (RAM) 286. The CPU 284, the ROM 285, and the RAM 286 form a control means.

The CPU 284 receives detection signals from the first detector 292, the second detector 293, the specific gravity gage 278, and the viscosity gage 280 and operation signals from an operation panel 287. The CPU 284 also sends actuation signals to the temperature detector 281, the valves, the pumps, and the two decanters 246, 247 by way of drive circuits 288, 289, 290, and 291, respectively. The valves and pumps include those shown in FIGS. 19 to 21. However, only the reference numbers of valves and pumps that are especially related to the present invention are shown in FIG. 22.

When executing the separation process of the used slurry, the CPU 284 switches the valves 241 to 244 to open the transfer passage 239 that leads from the metering tank 234 to the separating/recovering mechanism 240. In this state, the CPU 284 actuates the pump 245 to transfer the used slurry from the metering tank 234 to the separating/recovering mechanism 240. When transferring the used slurry, the CPU 284 carries out a process by following the flowchart illustrated in FIG. 23. The process will be described later.

During execution of the used slurry separation process, the CPU 284 also displays the detection values obtained by the specific gravity gage 278, the flow rate gage 279, and the viscosity gage 280, and the detection values obtained by the first detector 292 and the second detector 293 on an indicator (not shown), which is provided on the operation panel 287.

The CPU 284 switches the valves 243, 244, 272–274 during preparation and after preparation of the slurry in the preparing tanks 254 to open the passageway that extends through part of the supply passage 271 and the circulation passage 276 from the preparing tanks 254 and returns to the preparing tanks 254. In this state, the CPU 284 actuates the pump 275 to circulate the slurry in the preparing tanks 254 through part of the supply passage 271 and through the circulation passage 276.

During circulation of the slurry, the CPU 284 detects the specific gravity, flow rate, and viscosity of the slurry with the specific gravity gage 278, the flow rate gage 279, and the viscosity gage 280, respectively. The CPU 284 then adjusts the amount of abrasive grains fed to the preparing tanks 254 from the hoppers 258 and the amount of dispersing liquid sent to the preparing tanks 254 from the dispersing liquid tanks 264. This keeps the slurry preparation ratio of the abrasive grains and the dispersing liquid in the preparing tanks 254 at an optimal value, that is, as described above, approximately 1:0.6 to 1:0.98 by weight (and preferably 1:0.6 to 1:0.91).

The operation of the slurry managing system in this embodiment will now be described. When the cutting of workpieces begins in each wire saw 211, the slurry in the slurry tanks 212 is sent to the wires saws 211 and the slurry used by the wire saws 211 is returned to the slurry tanks 212. The used slurry in the slurry tanks 212 is sent to the recovery tank 224 periodically or each time cutting is completed. Additionally, the slurry tanks 212 are replenished with slurry, which is sent from the supply tank, in accordance with the recovered amount of the used slurry.

The used slurry in the recovery tank 224 is sent to the metering tank 234 from the conveying passage 229. The used slurry in the metering tank 234 is further sent to the separating/recovering mechanism 240 through the transfer passage 239. Recyclable abrasive grains and dispersing liquid are recovered from the used slurry by the first decanter 246 and the second decanter 247 in the separating/recovering mechanism 240. The recovered abrasive grains and dispersing liquid are returned to the preparing tanks 254 in a mixed state. In the preparing tanks 254, the recovered abrasive grains and dispersing liquid are mixed with fresh abrasive grains, which are sent from the hoppers 258, and with fresh dispersing liquid, which is sent from the dispersing liquid tanks 264 to prepare slurry having the appropriate preparation ratio.

During or after preparation of the slurry, the slurry in the preparing tanks 254 is circulated through the circulation passage 276. When the liquid level of the slurry in the preparing tanks 254 falls to a predetermined level or lower, the prepared slurry in the preparing tanks 254 is sent to the supply tank 216 through the supply passage 271.

The adjustment of the slurry temperature that is carried out during the used slurry separation process will now be described with reference to the flowchart of FIG. 23. The adjustment is executed by the CPU 284 based on a control program stored in the ROM 285.

If it is confirmed that the slurry separation process has been commenced in step S11, the CPU 284 proceeds to step S12. At step S12, the CPU 284 detects the nature (specific gravity or viscosity) of the primary separation liquid, which is sent to the second decanter 247 from the first decanter 246, based on the detection signals sent from the first detector 292.

Subsequently, at step S13, the CPU 284 judges whether or not the detection value indicating the nature of the primary separation liquid is within a predetermined range, which is stored in the RAM 286. For example, if the specific gravity of the primary separation liquid is detected, it is judged whether or not the detection specific gravity value is within the range of 1.00 to 1.05. If the viscosity of the primary separation liquid is detected, it is judged whether or not the detected viscosity value is within the range of 50 cp to 120 cp.

If the detection value is not in the predetermined range, the CPU 284 proceeds to step S14 and controls the temperature adjustor 281 to increase or decrease the temperature of the used slurry, which is sent to the first decanter 246, so that the detection value enters the predetermined range. Afterward, the CPU 284 returns to the step S12 and performs steps S12 to S14 repeatedly until the value detected by the first detector 292 enters the predetermined range.

For example, if the viscosity of the primary separation liquid is detected and the value of the detected viscosity is higher than the predetermined value, the temperature of the used slurry is increased to decrease the viscosity of the used slurry. On the other hand, if the value of the detected viscosity is lower than the predetermined value, the temperature of the used slurry is decreased to increase the viscosity of the used slurry. The predetermined value is determined in accordance with the type of slurry being used, the setting conditions of the decanters 246, 247, and other parameters such that satisfactory separation is carried out by the decanters 246, 247.

If the detection value is within the predetermined range in step S13, the CPU 284 proceeds to step S15 and judges whether or not the slurry separation process has been completed. Steps S12 to S15 are repeatedly performed by the CPU 284 until the slurry separation process is completed.

As described above, in this embodiment, the first detector 292 detects the nature (specific gravity or viscosity) of the primary separation liquid recovered by the first decanter 246. Furthermore, the temperature of the used slurry is adjusted to control the viscosity of the used slurry such that the detection value is maintained within the predetermined range. This keeps the separating efficiency of the first decanter 246 and the second decanter 247 in the separating/recovering mechanism constant. Thus, recyclable abrasive grains and dispersing liquid is efficiently recovered from the used slurry.

The structure is simple since only the temperature of the used slurry, which is sent to the separating/recovering mechanism 240, is required to be adjusted by the temperature adjustor 281 and the CPU 284, which controls the temperature adjustor 281.

The number of preparing tanks 254 may be only one. In this case, the supply tank 216 may be eliminated, and the slurry prepared in the single preparing tank 254 may directly be sent to the slurry tanks 212 of the wire saws 211.

The recovery tank 223 may be eliminated, and used slurry may directly be drawn into the metering tank 234 from the slurry tanks 212 of the wire saws 211.

The second decanter 247 may be eliminated, and the system may be changed to one that recovers only abrasive grains.

Eleventh Embodiment

Figure 23:
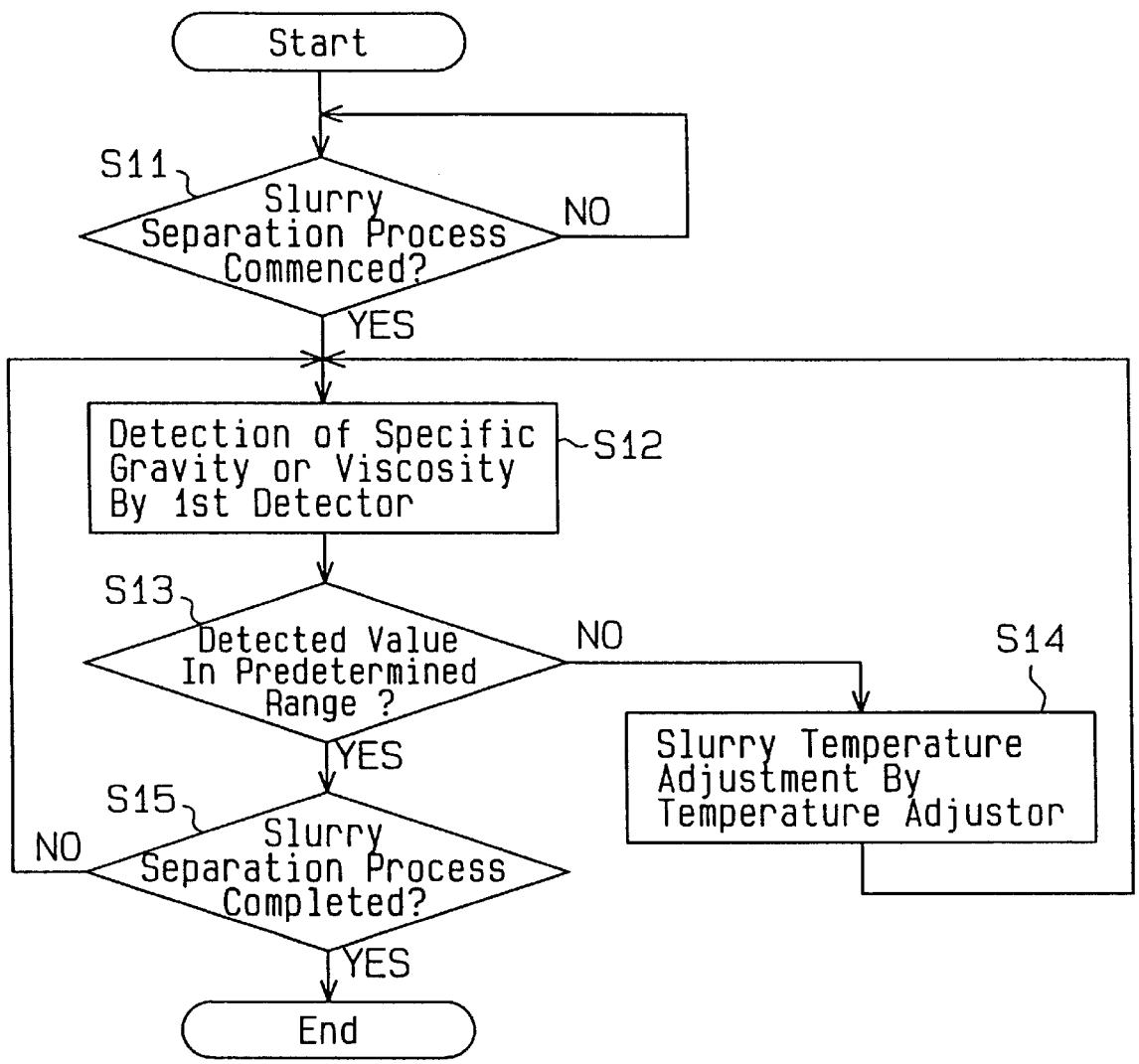
FIG. 23 is a flowchart illustrating the adjustment of the slurry temperature in a tenth embodiment.
Figure 24:
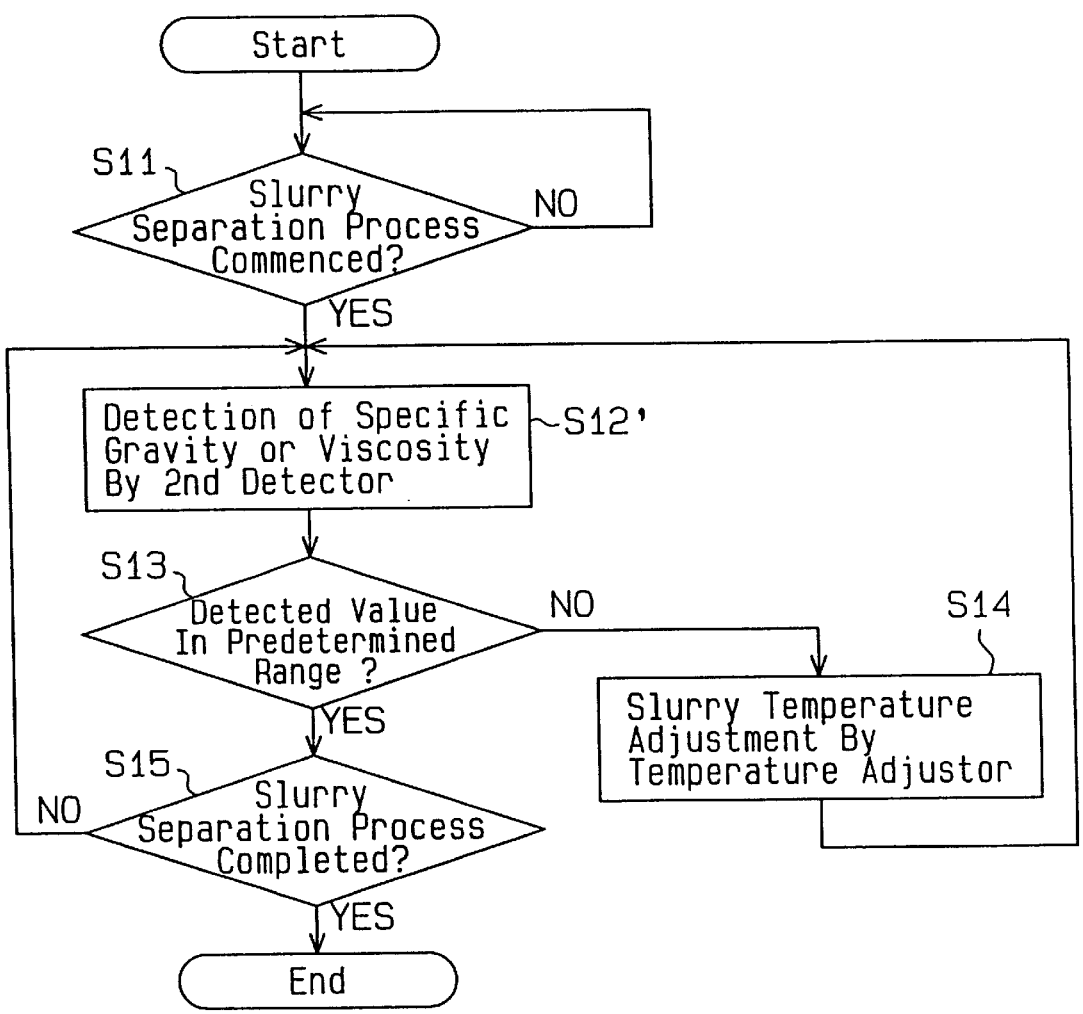
FIG. 24 is a flowchart illustrating the adjustment of the slurry temperature in an eleventh embodiment.

In the eleventh embodiment, which is illustrated in FIG. 24, step S12 in the flowchart of FIG. 23 is replaced by step S12'. At step S12', the CPU 284 detects the nature (specific gravity or viscosity) of the secondary separation liquid, which is recovered by the second decanter 247 based on the detection signals sent from the second detector 293. For example, if the specific gravity of the secondary separation liquid is detected, it is judged whether or not the value of the detected specific gravity is within the range of 0.92 to 0.99 in the following step S13. If the viscosity of the secondary separation liquid is detected, it is judged whether or not the value of the detected viscosity is within the range of 30 cp to 70 cp. The advantages of this embodiment are the same as that of the embodiment illustrated in FIG. 23.

Twelfth Embodiment

Figure 25:
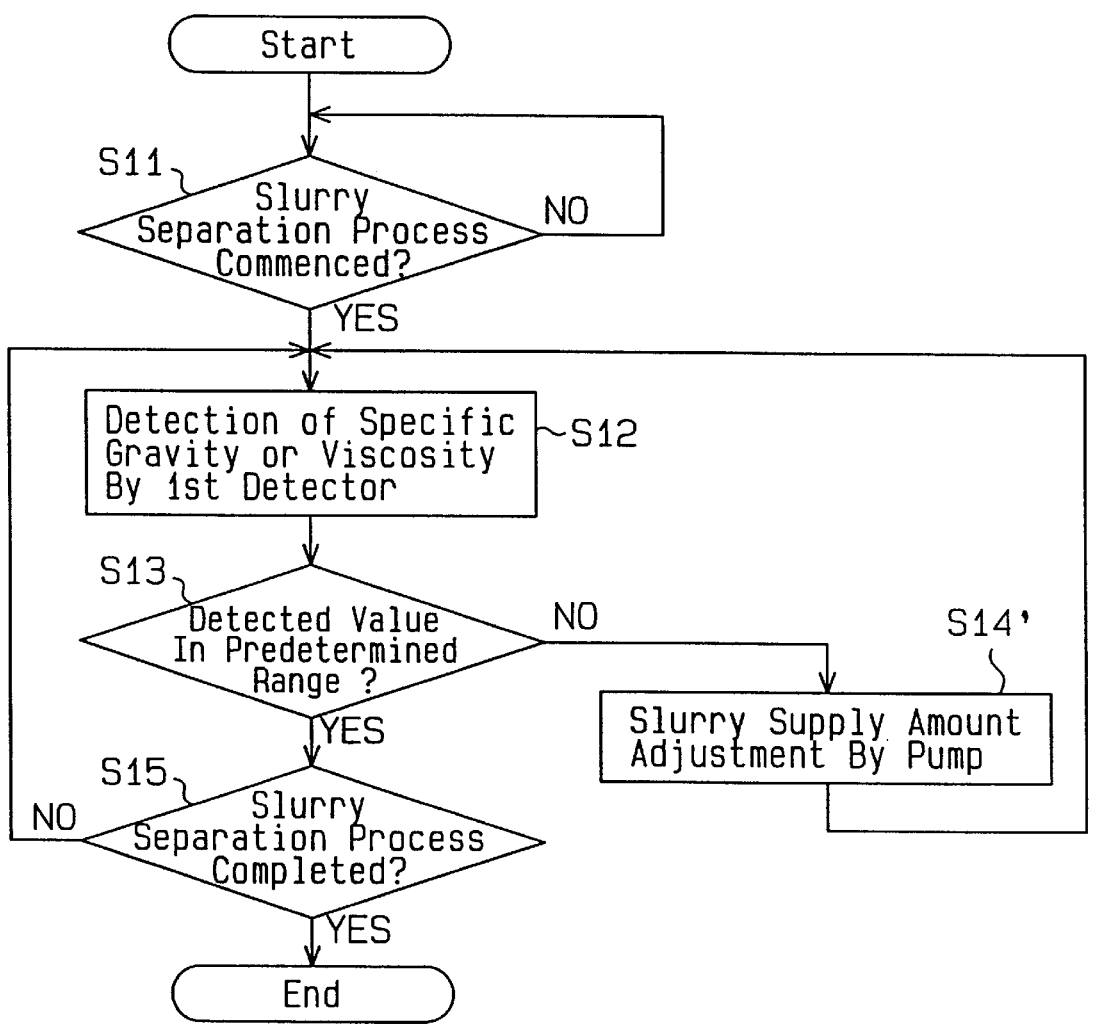
FIG. 25 is a flowchart illustrating the adjustment of the amount of the slurry supply in a twelfth embodiment.

In the twelfth embodiment, which is illustrated in FIG. 25, step S14 in the flowchart of FIG. 23 is replaced by step S14'. At step S14', the CPU 284 controls the pump 245 to increase or decrease the amount of the used slurry sent to the first decanter 246 such that the detection value indicating the nature of the primary separation liquid is within the predetermined range. An inverter controlled mohno pump may be employed as the pump 245.

The structure is simple since only the amount of the used slurry, which is sent to the separating/recovering mechanism 240, is required to be adjusted by the pump 245 and the CPU 284, which controls the pump 245.

The viscosity of the slurry is correlated with the amount of solids (abrasive grains and impurities) included in the slurry. Therefore, by adjusting the amount of used slurry sent to the first decanter 246 in accordance with the viscosity of the primary separation liquid, the amount of the solids sent to the first decanter 246 is constant. Accordingly, the load applied to the two decanters 246, 247 is substantially constant, and the decanters 246, 247 constantly perform satisfactory separation.

Thirteenth Embodiment

Figure 26:
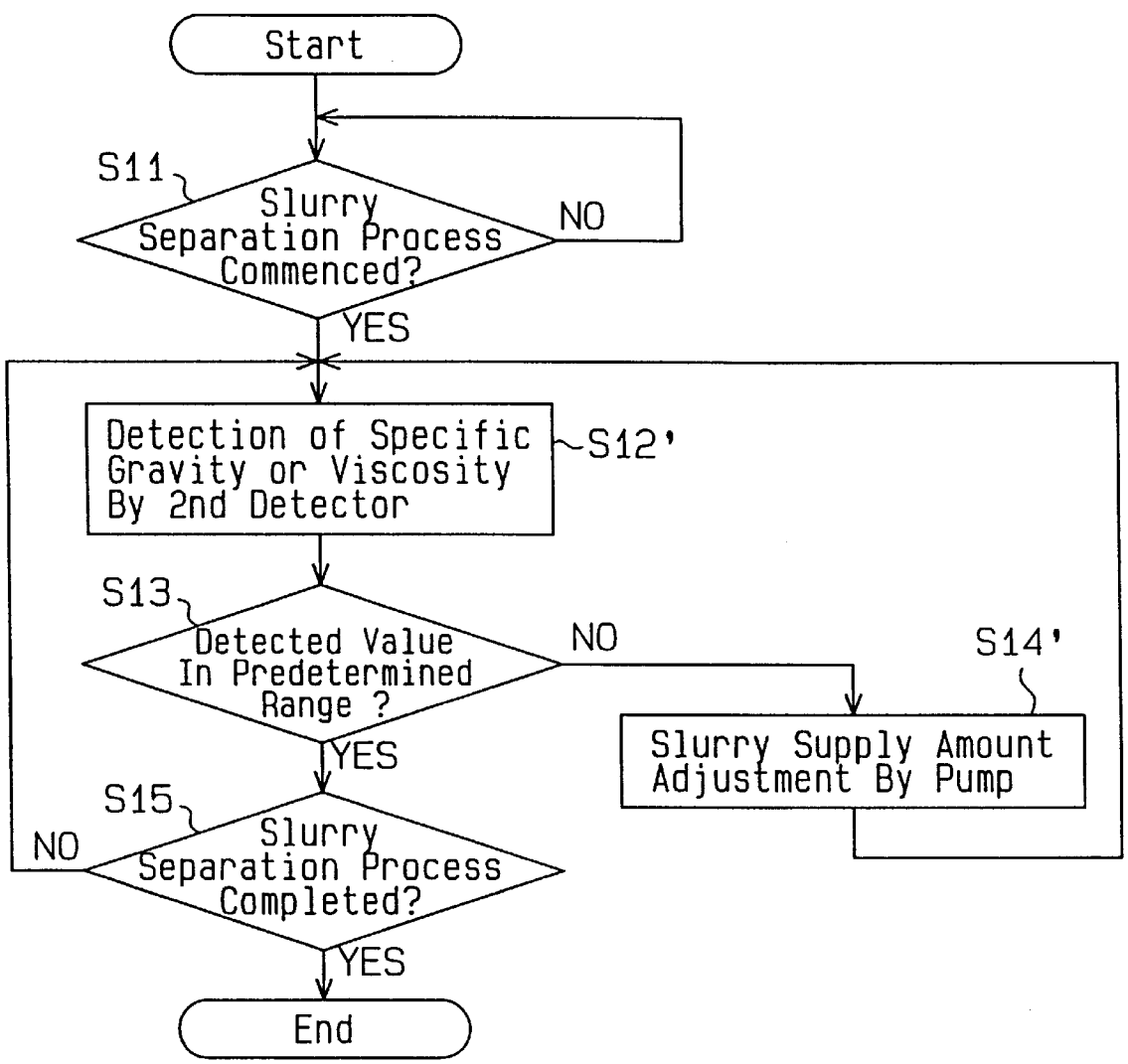
FIG. 26 is a flowchart illustrating the adjustment of the amount of the slurry supply in a thirteenth embodiment.

In the thirteenth embodiment, which is illustrated in FIG. 26, step S12 in the flowchart of FIG. 25 is replaced by step S12'. Step S12' is identical to step S12' of FIG. 24. The advantages of this embodiment are the same as that of the embodiment illustrated in FIG. 25.

Fourteenth Embodiment

Figure 27:
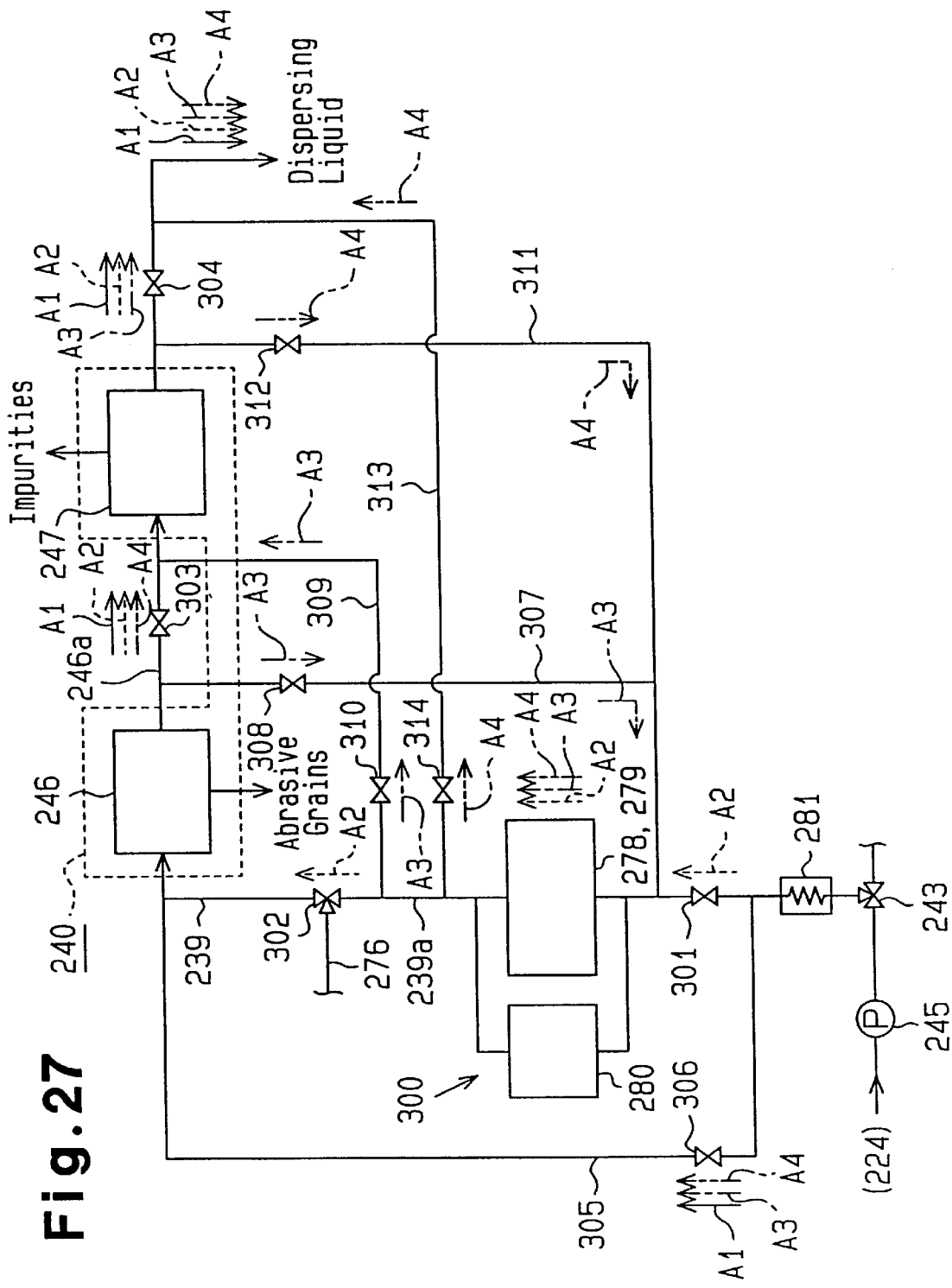
FIG. 27 is a diagrammatic view showing part of a slurry managing system in a fourteenth embodiment.

Part of the slurry managing system of the embodiment illustrated in FIGS. 19 to 21 is changed in the fourteenth embodiment, which is illustrated in FIG. 27. The changed parts are shown schematically. In FIG. 27, the same reference numerals are given to those components that are the same as the corresponding components of the managing system illustrated in FIGS. 19 to 21.

As shown in FIG. 27, the common passage 239*a*, which serves as the transfer passage 239 and the circulation passage 276, extends between the valve 243 and a second valve 302 (corresponding to the valve 244 of FIG. 20). The circulation passage 276 extends from the second valve 302 toward the preparing tanks 254 (FIG. 20). A first valve 301 is arranged in the common passage 239*a* upstream of the detector 300, which includes the specific gravity gage 278, the flow rate gage 279, and the viscosity gage 280. A third valve 303 is arranged in the passage 246*a* extending from the first decanter 246 toward the second decanter 247. A fourth valve 304 is arranged in a dispersing liquid discharge passage (corresponding to the discharge passage 247*a* of FIG. 21) extending from the second decanter 247.

A bypass passage 305, which bypasses the first valve 301, the detector 300, and the second valve 302, extends between the common passage 239*a* downstream of the temperature adjustor 281 and the separating/recovering mechanism 240. A fifth valve 306 is arranged in the bypass passage 305.

A first ingoing passage 307 extends between the passage 246*a* upstream of the third valve 303 and the common passage 239*a* upstream of the detector 300. A sixth valve 308 is arranged in the first ingoing passage 307. A first outgoing passage 309 extends between the common passage 239*a* downstream of the detector 300 and the passage 246*a* downstream of the third valve 303. A seventh valve 310 is arranged in the first outgoing passage 309.

A second ingoing passage 311 extends between the dispersing liquid discharge passage of the second decanter 247 and the common passage 239*a* upstream of the detector 300. An eighth valve 312 is arranged in the second ingoing passage 311. A second outgoing passage 313 extends between the common passage 239 downstream of the detector 300 and the downstream side of the fourth valve 304. A ninth valve 314 is arranged in the second outgoing passage 313.

The first to ninth valves 301 to 304, 306, 308, 310, 312, 314 are selectively opened and closed to switch the flow passage. In accordance with the selected flow passage, the detector 300 sequentially detects the properties (specific gravity, flow rate, and viscosity) of the used slurry, the primary separation liquid, which is centrifuged by the first decanter 246, and the secondary separation liquid, which is centrifuged by the second decanter 247. In other words, the detector 300 functions as the first detector 292 and the second detector 293 of FIG. 21.

Figure 28:
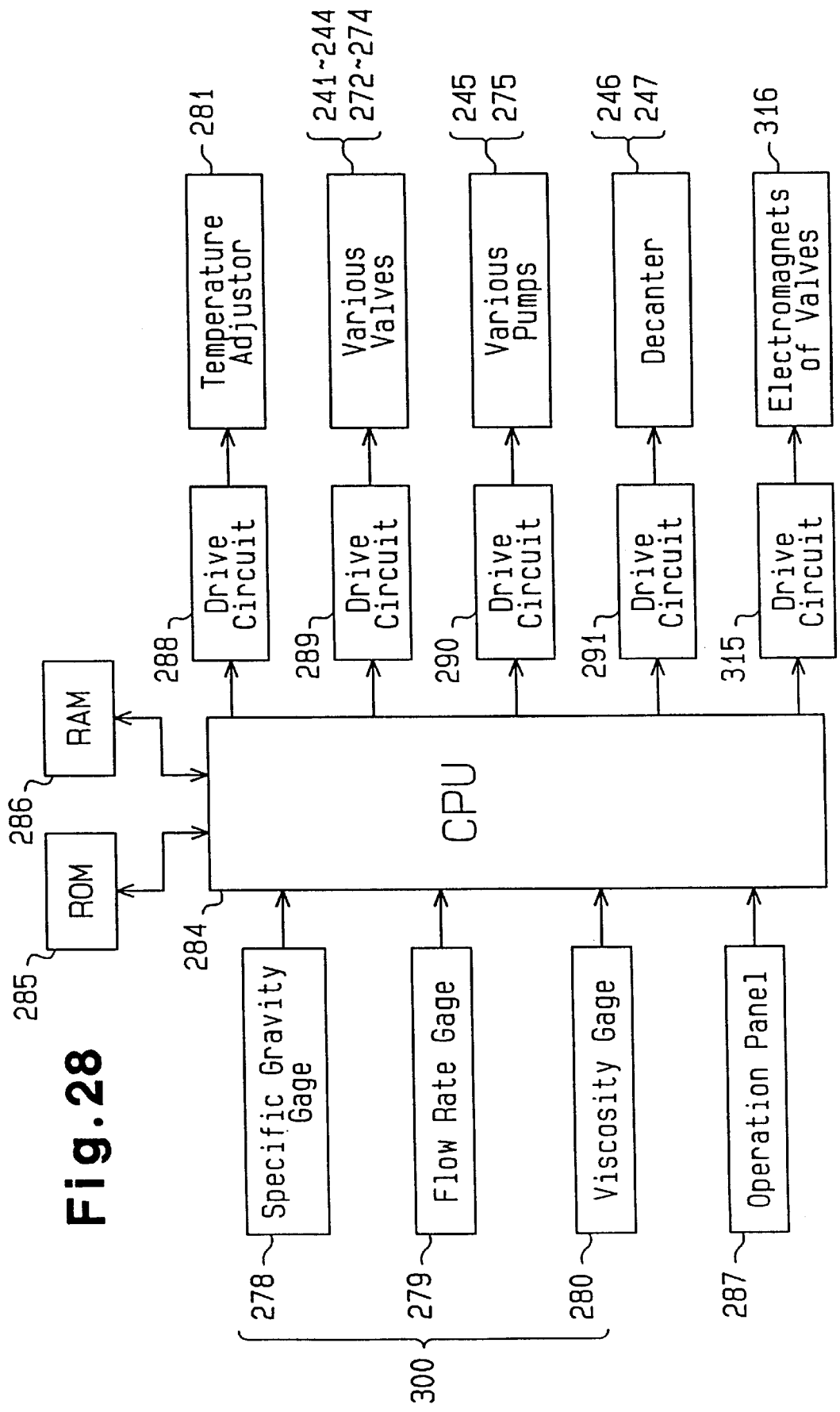
FIG. 28 is a block diagram showing the electric structure of the slurry managing system of FIG. 27.

The electric structure of the above slurry managing system will now be described with reference to FIG. 28. The same reference numerals are given to those components that are the same as the corresponding components of the managing system illustrated in FIGS. 22. As shown in FIG. 28, the CPU 248 receives detection signals from the specific gravity gage 278, the flow rate gage 279, and the viscosity gage 280, and operation signals from an operation panel 287. The CPU 284 also sends actuation signals to switching electromagnets 316, each of which are provided for one of the first to ninth valves 301 to 304, 306, 308, 310, 312, 314, by way of a drive circuit 315.

When used slurry is sent to the separating/recovering mechanism 240 or when the slurry in the preparing tank 254 (FIG. 20) is circulated through the circulation passage 276, the CPU 284 detects the specific gravity, the flow rate, and the viscosity of the slurry prior to separation with the detector 300. The CPU 284 then stores the detection results in the RAM 286.

The CPU 284 also switches the flow passage with the first to ninth valves to detect the specific gravity, the flow rate, and the viscosity of the primary separation liquid, which is centrifuged by the first decanter 246, with the detector 300. The CPU 284 then stores the detection results in the RAM 286. Furthermore, the CPU 284 switches the flow passage with the first to ninth valves to detect the specific gravity, the flow rate, and the viscosity of the secondary separation liquid, which is centrifuged by the second decanter 247, with the detector 300. The CPU 284 then stores the detection results in the RAM 286.

The CPU 284 displays these detection values on an indicator provided on the operation panel 287. The CPU 284 further uses these detection results to adjust the temperature or the supply amount of the used slurry by following one of the flowcharts illustrated in FIGS. 23, 24, 25, and 26.

The operation of the slurry managing system of this embodiment will now be described. Normally, during the slurry separation process, the third to fifth valves 303, 304, 306 are opened, while the remaining first, second, and sixth to ninth valves 301, 302, 308, 310, 312, 314 are closed. In this state, the slurry used by each wire saw 211 is guided to the separating/recovering mechanism 240 from the recovery tank 224 (FIG. 19) through the bypass passage 305 without passing through the detector 300, as shown in FIG. 27 by solid line arrows A1. The recyclable abrasive grains and secondary separation liquid, or purified dispersing liquid, are recovered from the used slurry by the first decanter 246 and the second decanter 247 and then returned to the preparing tanks 254 (FIG. 20).

During the slurry separation process, the CPU 284 switches the first to ninth valves 301 to 304, 306, 308, 310, 312, 314 every predetermined time period to sequentially detect the nature (specific gravity, flow rate, and viscosity) of the used slurry, the primary separation liquid, and the secondary separation liquid.

When detecting the nature of the used slurry, only the first to fourth valves 301 to 304 are opened. The remaining fifth to ninth valves 306, 308, 310, 312, 314 are closed. This transfers the used slurry through the detector 300, the first decanter 246, and the second decanter 32, as shown in FIG. 27 by dotted-line arrows A2. Accordingly, the specific gravity gage 278, the flow rate gage 279, and the viscosity gage 280 send detection signals related to the specific gravity, the flow rate, and the viscosity of the used slurry to the CPU 284.

When detecting the nature of the primary separation liquid, only the fourth to seventh valves 304, 306, 308 are opened. The other valves 301 to 303, 312, 314 are closed. This transfers the used slurry through the bypass passage 305, the first decanter 246, the first ingoing passage 307, the detector 300, the first outgoing passage 309, and the second decanter 247, as shown in FIG. 27 by single-dot-line arrows A3. Accordingly, the specific gravity gage 278, the flow rate gage 279, and the viscosity gage 280 send detection signals related to the specific gravity, the flow rate, and the viscosity of the primary separation liquid, which is separated in the first decanter 246, to the CPU 284.

When detecting the nature of the secondary separation liquid, or the recyclable dispersing liquid, only the third, fifth, eighth, and ninth valves 303, 306, 312, 314 are opened. The other valves 301, 302, 304, 308, 310 are closed. This transfers the used slurry through the bypass passage 305, the first decanter 246, the second decanter 247, the second ingoing passage 311, the detector 300, and the second outgoing passage 313, as shown in FIG. 27 by double-dot-line arrows A4. Accordingly, the specific gravity gage 278, the flow rate gage 279, and the viscosity gage 280 send detection signals related to the specific gravity, the flow rate, and the viscosity of the recyclable dispersing liquid, which is separated in the second decanter 247, to the CPU 284.

As described above, in this embodiment, the nature of the used slurry, the primary separation liquid, and the secondary separation liquid are detected sequentially with a just a single set of the specific gravity gage 278, the flow rate gage 279, and the viscosity gage 280 by switching the flow passage of the slurry with a plurality of valves. This minimizes the number of detectors for detecting the nature of the slurry and simplifies the detecting structure.

Although a number of embodiments have been described here, it should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. A managing system for managing slurry used to cut a workpiece, wherein the slurry includes a dispersing liquid and abrasive grains, and after the slurry has been used, the slurry further includes impurities that are finer than the abrasive grains, the managing system comprising:

a preparing means for preparing the slurry prior to cutting;

a first supplying means for supplying abrasive grains to the preparing means;

a second supplying means for supplying dispersing liquid to the preparing means;

a first adjusting means for adjusting the amount of the abrasive grains supplied to the preparing means from the first supplying means;

a second adjusting means for adjusting the amount of dispersing liquid supplied to the preparing means from the second supplying means;

a first separating means for separating a mixture of impurities and dispersing liquid from the used slurry to recover recyclable abrasive grains from the used slurry;

a second separating means for separating impurities from the mixture to recover recyclable dispersing liquid from the mixture;

a transferring means for transferring the recovered abrasive grains and the recovered dispersing liquid to the preparing means, wherein the preparing means mixes the recovered abrasive grains and the recovered dispersing liquid with fresh abrasive grains and dispersing liquid to prepare slurry;

a first detecting means for detecting a property of the slurry in the preparing means;

a second detecting means for detecting at least one of the specific gravity and viscosity of the mixture separated by the first separating means; and a control means for controlling the first adjusting means and the second adjusting means in accordance with the detection results of the first detecting means such that the property of the slurry becomes equal to a predetermined value.

2. The managing system according to claim 1, wherein the dispersing liquid includes either oil or water, wherein the first detecting means detects at least the specific gravity of the slurry, and wherein the control means controls the first adjusting means and the second adjusting means such that the weight ratio of the abrasive grains and the dispersing liquid in the slurry prepared by the preparing means is within a range between 1:0.91 to 1:0.6 if the dispersing liquid is oleaginous and within a range between 1:0.76 to 1:0.5 if the dispersing liquid is aqueous.

3. The managing system according to claim 1, wherein the dispersing liquid includes either oil or water, wherein the first detecting means detects at least the viscosity of the slurry, and wherein the control means controls the first adjusting means and the second adjusting means such that the viscosity of the slurry prepared by the preparing means is within a range between 150 to 220 centipoise if the dispersing liquid is oleaginous and within a range between 40 to 50 centipoise if the dispersing liquid is aqueous.

4. The managing system according to claim 1, wherein the first separating means is a screw type decanter for applying centrifugal force to the slurry to separate components in the slurry.

5. The managing system according to claim 4, wherein the screw type decanter applies centrifugal acceleration of 150 to 500 G to the slurry.

6. The managing system according to claim 1, wherein the second separating means is a screw type decanter for applying centrifugal force to the slurry to separate components in the slurry.

7. The managing system according to claim 6, wherein the screw type decanter applies centrifugal acceleration of 200 to 3,000 G to the slurry.

8. The managing system according to claim 1, wherein the first and second separating means are screw type decanters for applying centrifugal force to the slurry to separate components in the slurry.

9. The managing system according to claim 1, wherein the transferring means includes:

a first transferring means for transferring the abrasive grains recovered by the first separating means to the preparing means;

a second transferring means for transferring the dispersing liquid recovered by the second separating means to the preparing means, the second transferring means being connected to the first transferring means to mix the dispersing liquid with the abrasive grains passing through the first transferring means.

10. The managing system according to claim 1 further comprising:

a wire saw for cutting a workpiece;

a washing means for washing the wire saw with washing liquid to wash off slurry that adheres to the wire saw when cutting the workpiece, wherein the washing liquid includes abrasive grains;

wherein the first separating means separates recyclable abrasive grains from the washing liquid; and wherein the transferring means transfers the separated abrasive grains to the preparing means.

11. The managing system according to claim 10, wherein the washing liquid includes either oil or water.

12. A managing system for managing slurry used to cut a workpiece, wherein the slurry includes a dispersing liquid and abrasive grains and after the slurry has been used, the slurry further includes impurities that are finer than the abrasive grains, the managing system comprising:

a preparing means for preparing the slurry prior to cutting;

a first supplying means for supplying abrasive grains to the preparing means;

a second supplying means for supplying dispersing liquid to the preparing means;

a first adjusting means for adjusting the amount of the abrasive grains supplied to the preparing means from the first supplying means;

a second adjusting means for adjusting the amount of dispersing liquid supplied to the preparing means from the second supplying means;

a first separating means for separating a mixture of impurities and dispersing liquid from the used slurry to recover recyclable abrasive grains from the used slurry;

a second separating means for separating impurities from the mixture to recover recyclable dispersing liquid from the mixture;

a transferring means for transferring the recovered abrasive grains and the recovered dispersing liquid to the preparing means, wherein the preparing means mixes the recovered abrasive grains and the recovered dispersing liquid with fresh abrasive grains and dispersing liquid to prepare slurry;

a first detecting means for detecting a property of the slurry in the preparing means;

a second detecting means for detecting at least one of the specific gravity and viscosity of the dispersing liquid recovered by the second separating means; and a control means for controlling the first adjusting means and the second adjusting means in accordance with the detection results of the first detecting means such that the property of the slurry becomes equal to a predetermined value.

13. A managing system for managing slurry used to cut a workpiece, wherein the slurry includes a dispersing liquid and abrasive grains, and after the slurry has been used, the slurry further includes impurities that are finer than the abrasive grains, the managing system comprising:

a preparing means for preparing the slurry prior to cutting;

a first supplying means for supplying abrasive grains to the preparing means;

a second supplying means for supplying dispersing liquid to the preparing means;

a first adjusting means for adjusting the amount of the abrasive rains supplied to the preparing means from the first supplying means;

a second adjusting means for adjusting the amount of dispersing liquid supplied to the preparing means from the second supplying means;

a separating means for separating the impurities from the used slurry to recover a mixture of recyclable dispersing liquid and abrasive grains from the slurry;

a transferring means for transferring the recovered mixture to the preparing means, wherein the preparing means mixes the recovered mixture with fresh abrasive grains and dispersing liquid to prepare slurry;

a first detecting means for detecting a property of the slurry in the preparing means;

a control means for controlling the first adjusting means and the second adjusting means in accordance with the detection results of the first detecting means such that the property of the slurry becomes equal to a predetermined value:

a second detecting means for detecting a property of the slurry that has undergone a separation process in the separating means; and an adjusting means for adjusting the temperature of the used slurry prior to delivery to the separating means in accordance with the property of the slurry detected by the second detecting means.

14. The managing system according to claim 13, wherein the separating means includes a centrifuge means for applying centrifugal force to the slurry to separate components in the slurry.

15. The managing system according to claim 13, wherein the separating means includes:
a first separating means for centrifugally separating a mixture of impurities and dispersing liquid from the used slurry to recover recyclable abrasive grains from the slurry, wherein the second detecting means detects a property of the mixture separated by the first separating means; and
a second separating means for centrifugally separating impurities from the mixture to recover recyclable dispersing liquid from the mixture.

16. The managing system according to claim 13, wherein the separating means includes:
a first separating means for centrifugally separating a mixture of impurities and dispersing liquid from the used slurry to recover recyclable abrasive grains from the slurry; and
a second separating means for centrifugally separating impurities from the mixture to recover recyclable dispersing liquid from the mixture, wherein the second detecting means detects a property of the dispersing liquid recovered by the second separating means.

17. The managing system according to claim 13, wherein the second detecting means detects at least one of the specific gravity and the viscosity of the slurry.

18. The managing system according to claim 13, wherein the separating means applies centrifugal force to the slurry to separate components in the slurry.

19. A managing system for managing slurry used to cut a workpiece, wherein the slurry includes a dispersing liquid and abrasive grains, and after the slurry has been used, the slurry further includes impurities that are finer than the abrasive grains, the managing system comprising;

a preparing means for preparing the slurry prior to cutting;

a first supplying means for supplying abrasive grains to the preparing means;

a second supplying means for supplying dispersing liquid to the preparing means;

a first adjusting means for adjusting the amount of the abrasive grains supplied to the preparing means from the first supplying means;

a second adjusting means for adjusting the amount of dispersing liquid supplied to the preparing means from the second supplying means:

a separating means for separating the impurities from the used slurry to recover a mixture of recyclable dispersing liquid and abrasive grains from the slurry;

a transferring means for transferring the recovered mixture to the preparing means, wherein the preparing means mixes the recovered mixture with fresh abrasive grains and dispersing liquid to prepare slurry;

a first detecting means for detecting a property of the slurry in the preparing means;

a control means for controlling the first adjusting means and the second adjusting means in accordance with the detection results of the first detecting means such that the property of the slurry becomes equal to a predetermined value:;

a second detecting means for detecting a property of the slurry that has undergone a separation process in the separating means; and an adjusting means for adjusting the amount of the used slurry sent to the separating means in accordance with the property of the slurry detected by the second detecting means.

20. The managing system according to claim 19, wherein the separating means includes:
a first separating means for centrifugally separating a mixture of impurities and dispersing liquid from the used slurry to recover recyclable abrasive grains from the slurry, wherein the second detecting means detects a property of the mixture separated by the first separating means; and
a second separating means for centrifugally separating impurities from the mixture to recover recyclable dispersing liquid from the mixture.

21. The managing system according to claim 19, wherein the separating means includes:
a first separating means for centrifugally separating a mixture of impurities and dispersing liquid from the used slurry to recover recyclable abrasive grains from the slurry; and
a second separating means for centrifugally separating impurities from the mixture to recover recyclable dispersing liquid from the mixture, wherein the second detecting means detects a property of the dispersing liquid recovered by the second separating means.

22. The managing system according to claim 19, wherein the second detecting means detects at least one of the specific gravity and the viscosity of the slurry.

23. The managing system according to claim 19, wherein the separating means applies centrifugal force to the slurry to separate components in the slurry.

24. A managing method for managing slurry used to cut a workpiece, wherein the slurry includes a dispersing liquid and abrasive grains, and after the slurry has been used, the slurry further includes impurities that are finer than the abrasive grains, the managing method comprising:

preparing the slurry prior to cutting;

separating a mixture of impurities and dispersing liquid from the used slurry to recover recyclable abrasive grains from the used slurry;

detecting at least one of the specific gravity and viscosity of the separated mixture;

separating impurities from the mixture to recover recyclable dispersing liquid from the mixture;

mixing the recovered abrasive grains and the recovered dispersing liquid with fresh abrasive grains and dispersing liquid to prepare slurry;

detecting a property of the slurry that is undergoing the mixing; and controlling the amount of the fresh abrasive grains and dispersing liquid added to the recovered abrasive grains and the recovered dispersing; liquid in accordance with the detected property of the slurry such that the property of the slurry becomes equal to a predetermined value.

25. A managing method for managing slurry used to cut a workpiece, wherein the slurry includes a dispersing liquid and abrasive grains, and after the slurry has been used, the slurry further includes impurities that are finer than the abrasive grains, the managing method comprising:

preparing the slurry prior to cutting;

separating a mixture of impurities and dispersing liquid from the used slurry to recover recyclable abrasive grains from the used slurry;

separating impurities from the mixture to recover recyclable dispersing liquid from the mixture;

detecting at least one of the specific gravity and viscosity of the recovered dispersing liquid;

mixing the recovered abrasive grains and the recovered dispersing liquid with fresh abrasive grains and dispersing liquid to prepare slurry;

detecting a property of the slurry that is undergoing the mixing; and controlling the amount of the fresh abrasive grains and dispersing liquid added to the recovered abrasive grains and the recovered dispersing liquid in accordance with the detected property of the slurry such that the property of the slurry becomes equal to a predetermined value.

26. A managing method for managing slurry used to cut a workpiece, wherein the slurry includes a dispersing liquid and abrasive grains, and after the slurry has been used, the slurry further includes impurities that are finer than the abrasive grains, the managing method comprising:

preparing the slurry prior to cutting;

separating the impurities from the used slurry to recover a mixture of recyclable dispersing liquid and abrasive grains from the slurry;

mixing the recovered mixture with fresh abrasive grains and dispersing liquid to prepare slurry;

detecting a property of the slurry that is undergoing the mixing;

controlling the amount of the fresh abrasive grains and dispersing liquid added to the mixture in accordance with the detected property of the slurry such that the property of the slurry becomes equal to a predetermined value;

detecting a property of the slurry that has undergone the separating; and adjusting the temperature of the used slurry prior to undergoing the separating in accordance with the property of the slurry that has undergone the separating.

27. The managing method according to claim 26, wherein the step of separating the impurities from the used slurry includes:

centrifugally separating a mixture of impurities and dispersing liquid from the used slurry to recover recyclable abrasive grains from the slurry, wherein the step of detecting a property of the slurry that has undergone the separating includes detecting a property of the separated mixture; and centrifugally separating impurities from the mixture to recover recyclable dispersing liquid from the mixture.

28. The managing method according to claim 26, wherein the step of separating the impurities from the used slurry includes:

centrifugally separating a mixture of impurities and dispersing liquid from the used slurry to recover recyclable abrasive grains from the slurry; and centrifugally separating impurities from the mixture to recover recyclable dispersing liquid from the mixture, wherein the step of detecting a property of the slurry that has undergone the separating includes detecting a property of the recovered dispersing liquid.

29. The managing method according to claim 26, wherein the step of detecting a property of the slurry that has undergone the separating includes detecting at least one of the specific gravity and the viscosity of the slurry.

30. The managing method according to claim 26, wherein the step of separating the impurities from the used slurry includes applying centrifugal force to the slurry to separate components in the slurry.

31. A managing method for managing slurry used to cut a workpiece, wherein the slurry includes a dispersing liquid and abrasive grains, and after the slurry has been used, the slurry further includes impurities that are finer than the abrasive grains, the managing method comprising:

preparing the slurry prior to cutting;

separating the impurities from the used slurry to recover a mixture of recyclable dispersing liquid and abrasive grains from the slurry at a separating location;

mixing the recovered mixture with fresh abrasive grains and dispersing liquid to prepare slurry;

detecting a property of the slurry that is undergoing the mixing;

controlling the amount of the fresh abrasive grains and dispersing liquid added to the mixture in accordance with the detected property of the slurry such that the property of the slurry becomes equal to a predetermined value;

detecting a property of the slurry that has undergone the separating; and adjusting the amount of the used slurry sent to the separating location in accordance with the property of the slurry that has undergone the separating.

32. The managing method according to claim 31, wherein the step of separating the impurities from the used slurry includes:

centrifugally separating a mixture of impurities and dispersing liquid from the used slurry to recover recyclable abrasive grains from the slurry, wherein the step of detecting a property of the slurry that has undergone the separating includes detecting a property of the separated mixture; and separating impurities from the mixture to recover recyclable dispersing liquid from the mixture.

33. The managing method according to claim 31, wherein the step of separating the impurities from the used slurry includes:
- centrifugally separating a mixture of impurities and dispersing liquid from the used slurry to recover recyclable abrasive grains from the slurry; and
- centrifugally separating impurities from the mixture to recover recyclable dispersing liquid from the mixture, wherein the step of detecting a property of the slurry that has undergone the separating includes detecting a property of the recovered dispersing liquid.

34. The managing method according to claim 31, wherein the step of detecting a property of the slurry that has undergone the separating includes detecting at least one of the specific gravity and the viscosity of the slurry.

35. The managing method according to claim 31, wherein the step of separating the impurities from the used slurry includes applying centrifugal force to the slurry to separate components in the slurry.

\* \* \* \* \*

UNITED STATES PATENT AND TRADEMARK OFFICE
CERTIFICATE OF CORRECTION

PATENT NO. : 6,161,533
DATED : December 19, 2000
INVENTOR(S) : Katsumata, et. al.

It is certified that error appears in the above-identified patent and that said Letters Patent is hereby corrected as shown below:

Title page, item [30], change "10-257543"

to

--10-357543--.

Signed and Sealed this

First Day of May, 2001

Attest:

NICHOLAS P. GODICI

*Attesting Officer*          *Acting Director of the United States Patent and Trademark Office*